United States Patent [19]

Mitchell et al.

[11] Patent Number: 5,799,273
[45] Date of Patent: Aug. 25, 1998

[54] AUTOMATED PROOFREADING USING INTERFACE LINKING RECOGNIZED WORDS TO THEIR AUDIO DATA WHILE TEXT IS BEING CHANGED

[75] Inventors: John C. Mitchell; Alan James Heard; Steven Norman Corbett; Nicholas John Daniel, all of Devon, England

[73] Assignee: AllVoice Computing Plc, Devon, England

[21] Appl. No.: 720,373

[22] Filed: Sep. 27, 1996

[51] Int. Cl.[6] .................................. G10L 7/08; G10L 9/06
[52] U.S. Cl. ........................ 704/235; 704/244; 704/270; 704/275
[58] Field of Search .............................. 395/2.44, 2.84, 395/2.53, 2.79, 2.1; 704/201, 235, 244, 270, 275

[56] References Cited

U.S. PATENT DOCUMENTS 5,031,113  7/1991  Hollerbauer ........................ 364/513.5

FOREIGN PATENT DOCUMENTS

| 0077194 | 4/1983 | European Pat. Off. | G10L 1/00 |
| 0649144 | 4/1995 | European Pat. Off. | G11B 27/28 |
| 2088106 | 6/1982 | United Kingdom | G06F 7/00 |
| 2230370 | 10/1990 | United Kingdom | G10L 5/06 |
| 2289395 | 11/1995 | United Kingdom | G11B 27/34 |
| 93/07562 | 4/1993 | WIPO | G06F 3/16 |

OTHER PUBLICATIONS

"Distinction at Exit Between Text Editing and Speech Recognition Adaption", *IBM Technical Disclosure Bulletin*, 37, 391, (Oct. 1994).

"Improved Correction of Speech Recognition Errors Through Audio Playback", *IBM Technical Disclosure Bulletin*, 36, 153–154, (Jun. 1993).

White paper of Philips Technology, 2 pgs., (Sep. 1994).
"A Smooth–talking Buy", *Personal Computer World*, Philips Natural Speech Processing product announcement, p. 36, (Oct. 1996).
"Apple to Sell Speech Recognition and Text–to–Speech Package", *Speech Recognition Update*, 5, (Apr. 1996).
"Dragon Dictate for Windows 2.0", User's Guide, British version, First edition, Dragon Systems, Inc., Newton, Massachusetts, 1–230, (1995).
"IBM Voice Type Dictation for Windows, UK English", User's Guide, Version 1.1, International Business Machines Corporation, 1–218, (Jan. 1995).
"New Release of Kurzweil AI Speech–to–Text Software", *Speech Recognition Update*, 5–6, (Apr. 1996).
"News Computing: Computing Bytes", *Scientific Computing World*, p. 10, (Sep. 1996).
"This Is It", *Philips Research Topics, No. 3*, 5–7, (1993).
"Turning Science Fiction into Reality", Product brochure posted on Internet at URL http://www.digitaldictate.com; Digital Dictate, L.L.C., Scottsdale, Arizona, 11 pags., (1995).

*Primary Examiner*—David R. Hudspeth
*Assistant Examiner*—Tālivaldis Ivars Šmits
*Attorney, Agent, or Firm*—Schwegman, Lundberg, Woessner & Kluth, P.A.

[57] ABSTRACT

Data processing apparatus is disclosed for receiving recognition data from a speech recognition engine and its corresponding dictated audio data where the recognition data includes recognised words or characters. A display displays the recognised words or characters and the recognised words or characters are stored as a file together with the corresponding audio data. Link data is formed to link the position of the words or characters in the file and the position of the corresponding audio component in the audio data. The recognised words or characters can be processed without loosing the audio data.

78 Claims, 17 Drawing Sheets

| IDENTIFIER TAG | AUDIO START | AUDIO END | ALTERNATIVE WORDS AND SCORES |
|---|---|---|---|
| 1 | 0 | 199 | n1aW1a n1bW1b n1cW1c ... |
| 2 | 199 | 324 | n2aW2a n2bW2b n2cW2c ... |
| 3 | 324 | 361 | ... |
| 4 | 361 | | |
| 5 | ... | | |

FIG. 3

| CHAR No | TAG | SCORE | WORD LENGTH | WORD | VOCAB LENGTH | VOCAB |
|---|---|---|---|---|---|---|

AUTOMATED PROOFREADING USING INTERFACE LINKING RECOGNIZED WORDS TO THEIR AUDIO DATA WHILE TEXT IS BEING CHANGED

FIELD OF THE INVENTION

The present invention generally relates to the field of data processing and in particular the field of processing the output of a speech recognition engine.

BACKGROUND ART

The use of speech recognition as an alternative method of inputting data to a computer is becoming more prevalent as speech recognition algorithms become ever more sophisticated and the processing capabilities of modern computers increases. Speech recognition systems are particularly attractive for people wishing to use computers who do not have keyboard skills.

There are several speech recognition systems currently on the market which can operate on a desktop computer. One such system is called DragonDictate (Trade Mark). This system allows a user to input both speech data and speech commands. The system can interface with many different applications to allow the recognised text output to be directly input into the application, e.g. a word processor. This system, however, suffers from the disadvantage that there is no audio recording of the dictation stored which can be replayed to aid the correction of the recognised text.

Another system which is currently on the market is IBM VoiceType version 1.1 (Trade Mark). In this system the recognised text from the speech recognition engine is input directly into a proprietary text processor and audio data is stored. This system, however, does not allow the recognised text to be directly input into any other application. The dictated text can only be input directly into the proprietary text processor provided whereupon at the end of dictation the text can be cut and pasted into other applications. Corrections to the dictated text in order to update the speech recogniser models can only be carried out within the text processor window. Text for recognition correction can be selected and the audio component corresponding to the text is played back to assist in the correction process. When all of the corrections have been completed, the text can either be saved or cut ready for pasting into another application. Either of these operations can cause the corrections made to be used to update the speech recogniser: the user has limited control over when the updates are made.

Not only is this system disadvantaged in not allowing direct dictation into applications, the system also does not allow the audio data to be stored in association with the text when the document is saved or when the text is cut and pasted into another application. Even a simple text processing operation, e.g. an insertion operation within a body of text, will prevent the playback of the audio component for that body of text including the change.

SUMMARY OF THE INVENTION

It is an object of the present invention to provide an interface between the output of a speech recognition engine and an application capable of processing the output which operates in a data processing apparatus to link the relationship between the output data and the audio data to allow the audio data to be played back for any output data which has been dictated even if the data as a whole has been processed in such a way as to move, reorder, delete, insert or format the data.

This object of the present invention can be achieved by a data processing apparatus comprising input means for receiving recognition data and corresponding audio data from a speech recognition engine, the recognition data including a string of recognised data characters and audio identifiers identifying audio components corresponding to a character component of the recognised characters; processing means for receiving and processing the input recognised characters to replace, insert, and/or move characters in the recognised characters and/or to position the recognised characters; link means for forming link data linking the audio and identifiers to the characters component positions in the character string even after processing; display means for displaying the characters being processed by the processing means; user operable selection means for selecting characters in the displayed characters for audio playback, where the link data identifies any selected audio components, if present, which are linked to the selected characters; and audio playback means for playing back the selected audio components in the order of the character component positions in the character string.

Thus, in accordance with this aspect of the present invention, positional changes of characters in the character string due to processing operations are monitored and the links which identify the corresponding audio component are updated accordingly. In this way, the corresponding audio component for any dictated character in the character string can be immediately identified even after processing. This allows for the audio component associated with any character to be played back by a selection operation by a user. This feature greatly enhances the ability to correct incorrectly recognised characters since a user will be able to hear what was dictated in order to decide what was actually said rather than what the speech recogniser recognised. This feature of being able to play back audio components corresponding to the characters is maintained even when dictated characters are inserted into previously dictated characters.

In the present invention the character data output from the speech recognition engine can comprise text or symbols in any language, numerals or any unicode. The characters can comprise words forming text or any unicode characters and the system can be configured to recognise dictated numbers and input the corresponding numeric characters to the application instead of the word descriptions.

The processing means of the present invention can comprise any application running on a processor which enables character data from a speech recognition engine to be entered and manipulated, e.g. a word processor, presentation applications such as Microsoft PowerPoint (Trade Mark) spreadsheets such as Excel (Trade Mark), email applications and CAD applications. In this aspect of the present invention the dictated character positions in the document, drawing or product of the application is linked to the corresponding audio component by link data.

In one aspect of the present invention the link data and audio data can all be stored. In this way the audio data is maintained for playback at a later time when, for instance, it may be wished to carry out corrections to correct speech recognition errors. The storage of the character data, link data and the audio data allows for corrections to be postponed or even delegated to another person on another machine.

Corrections to the incorrectly recognised character data can be made by correcting the character string which causes the playback of the audio component. The characters can then be corrected and the corrected characters and the audio identifier for the audio component corresponding to the corrected characters are passed to the speech recognition engine for updating user models used in the recognition process.

Where the output of the speech recognition engine includes a list of alternative characters together with an indicator which indicates the likelihood that the word is correct, when a word is selected for correction, a choice list can be displayed which comprises the alternative words listed alphabetically for ease of use. Corrections can then be carried out either by selecting one of the alternative characters or entering a new character.

In one embodiment, in order to maintain the links between the character components and the corresponding audio components, a list of character locations in the character string and positions in the corresponding audio components is kept. Where the character string is formed of a plurality of separate dictated passages, the audio data is separately stored and the list identifies in which of the stored audio passages and at which position the audio component lies in the audio passage.

In addition to the updating of the speech recognition model due to incorrectly recognised words, a passage of characters, or all of the characters, can be selected for updating the contextual model used by the speech recognition engine. Thus, in this embodiment of the invention the operator has control over when the contextual model is to be updated based on the corrections made to the characters.

It is an object of another aspect of the present invention to enable audio messages to be recorded and stored in association with a file containing character data output from a speech recognition engine to allow instructions or a reminder to be recorded.

In accordance with this object of the present invention there is provided data processing apparatus comprising means for receiving recognition data from a speech recognition engine and corresponding audio data, the recognition data including recognised characters; display means for displaying the recognised characters; storage means for storing the recognised characters as a file; means for selectively disabling the display and storage of recognised characters or recognition carried out by the speech recognition engine for a period of time; and means for storing the audio data for a period of time in the storage means as an audio message associated with the file.

It is an object of another aspect of the present invention to provide for the automatic detection of possibly incorrectly recognised characters in the character data output from the speech recognition engine.

In accordance with this aspect of the present invention, there is provided data correction apparatus comprising means for receiving recognition data from a speech recognition engine, said recognition data including recognised characters representing the most likely characters, and a likelihood indicator for each character indicating the likelihood that the character is correct; display means for displaying the recognised character; automatic error detection means for detecting possible errors in recognition of characters in the recognised characters by scanning the likelihood indicators for the recognised characters and detecting if the likelihood indicator for a character is below the likelihood threshold, whereby said display means highlights at least the first, if any, character having a likelihood indicator below the likelihood threshold; user operable selection means for selecting a character to replace an incorrectly recognised character highlighted in the recognised characters; and correction means for replacing the incorrectly recognised character and the selected character to correct the recognised characters.

The likelihood threshold can be selectively set by a user to a suitable level to reduce the number of characters which are falsely identified as incorrectly recognised whilst increasing the chances of correctly identifying incorrectly recognised characters. The provision of automatic detection of possible recognition errors can significantly decrease the time taken for correcting character data.

BRIEF DESCRIPTION OF THE DRAWINGS

FIG. 3 is a table representing the data output from the speech recognition engine;

FIG. 4 illustrates the data structure of the link data file;

DETAILED DESCRIPTION OF THE PREFERRED EMBODIMENTS

A specific embodiment will now be described with application to word processing of text output of a speech recognition engine.

Figure 1:
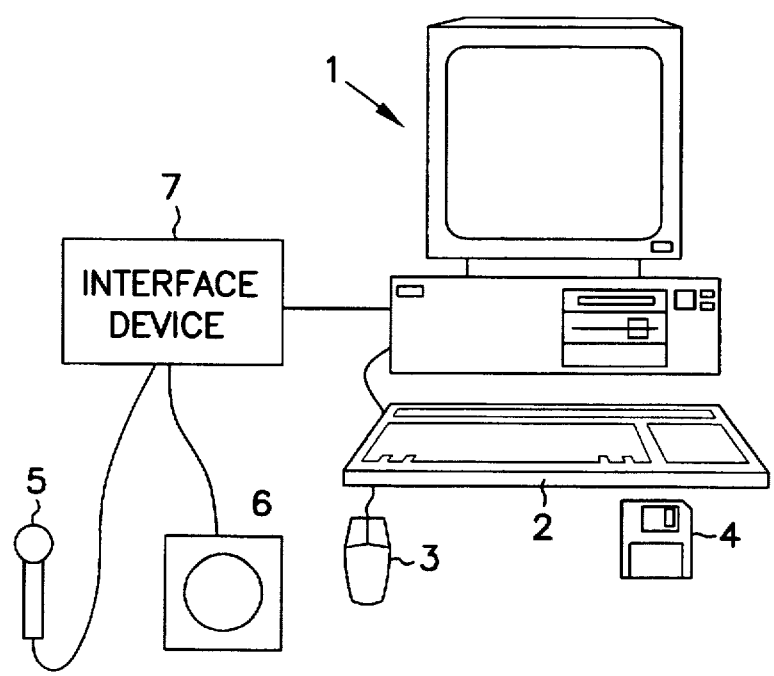
FIG. 1 is a schematic drawing of a speech recognition system in accordance with one embodiment of the present invention.

Referring to FIG. 1 there is illustrated a speech recognition system in accordance with one embodiment of the present invention which comprises an IBM (Trade Mark) compatible PC (personal computer) 1 having a keyboard 2 for inputting and correcting text and a pointing device 3 which in this embodiment is a mouse. Software applications are loaded into the computer from computer storage medium such as the floppy disc 4, an optical disk (CD ROM), or digital tape. The software applications comprise the speech recognition application which comprises the speech recognition engine, the application for processing text such as a word processor and the interface application to control the flow of text into the text processing application, to control the flow of updating information from the text processing application to the speech recognition application and for maintaining links between the text and the audio data.

The system is provided with a microphone 5, a loudspeaker 6 and an interface device 7. During dictation the audio signal from the microphone 5 is input into the interface device 7 which includes an analog to digital converter and a digital signal processor to digitise and condition the signal for input into the computer 1. During playback of the recorded audio signal, the audio signal is output from the computer 1 to the interface device 7 in digital form and is converted to an analog signal by a digital to analog converter within the interface device 7. The analog signal is then output from the interface device 7 to play back the audio recording.

In the specific embodiment of the present invention the interface device 7 is provided with the IBM VoiceType system. Also, the speech recognition engine used in the specific example is the IBM VoiceType speech recognition engine. The present invention is not, however, limited to any specific speech recognition engine and can also be used with any conventional hardware for recording and playing back sound in a personal computer, e.g. in an IBM compatible machine the sixteen bit sound blaster compatible standard can be used. The present invention can be used with either continuous or discrete speech recognition engines.

Figure 2:
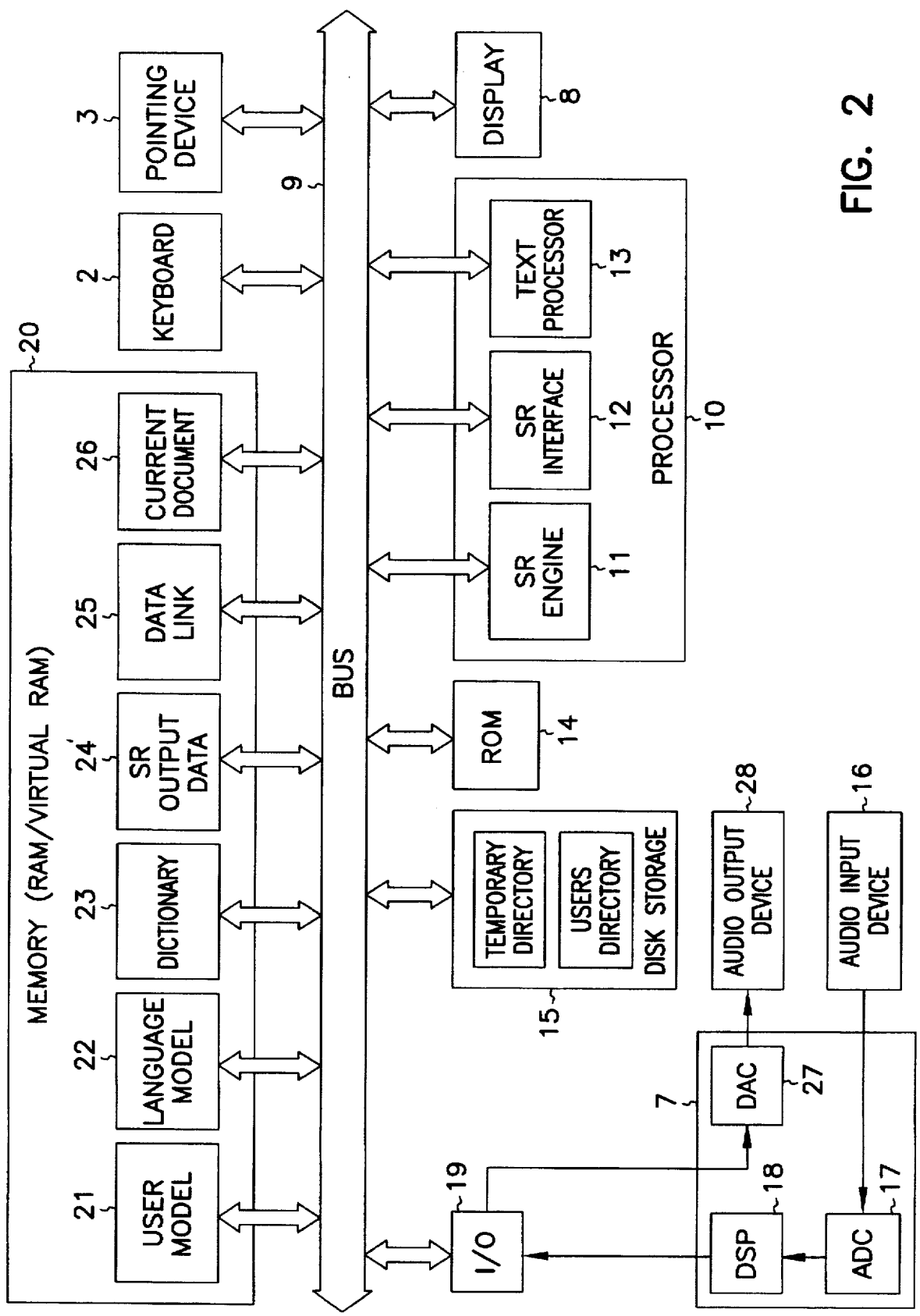
FIG. 2 is a schematic diagram of the internal structure of the speech recognition system.

Referring now to FIG. 2, this diagram illustrates a schematic overview of the internal architecture of the computer. A bus 9 links all of the components of the system and the Read Only Memory (ROM) 14 containing conventional systems programs and data. The processor 10 runs three applications simultaneously: the speech recognition engine application 11, the speech recognition interface application 12 and the text processor application 13. The memory 20, which can comprise random access memory (RAM) or in a Windows (Trade Mark) environment, virtual RAM. Within the memory 20 data is stored for the speech recognition engine application 11. This data comprises a user model 21 which can be updated to improve the accuracy of the recognition, a language model 22 and a dictionary 23 to which a user can add new words. The user model 21 comprises an acoustic model and a contextual model. During operation of the speech recognition engine application 11 the application utilises the user model 21, the language model 22 and the dictionary 23 in the memory 20 and outputs speech recognition data 24 to the memory 20. The speech recognition interface application 12 receives the speech recognition output data 24 and forms link data 25. The text component of the speech recognition output data 24 is also passed by the speech recognition interface application 12 to the text processor application 13 to form a current document 26 in the memory. The display 8 displays the text of the current document 26 stored in the memory 20 and the keyboard 2 can be used to insert, delete and move text. The pointing device 3 can also be used to select text and word processing operations in the conventional well known manner within Windows applications.

The system is also provided with non-volatile storage in the form of disk storage 15. Within the disk storage 15 two directories are provided. A temporary directory used by the speech recognition engine 11 for the storage of run time files which contain the speech recognition output data. A user's directory is also provided for the storage of document files by the text processor application 13 and associated link data formed by the speech recognition interface 12.

An audio input device 16 inputs the dictated audio signal to an analog to digital converter 17. Although in FIG. 1 the audio input device 16 is illustrated to be a microphone 5, the audio input could alternatively comprise a pre-recorded signal source, e.g. a digital audio tape (DAT). The digitised signal from the analog to digital converter 17 is then passed to a digital signal processor 18 for conditioning of the signal before input to the input/output device 19 of the computer 1. In this way the speech recognition engine application 11 is able to read the digitised input audio data via the bus 9 and output speech recognition output data 24 into the memory 20.

When the speech recognition interface application 12 interacts with the text processor application 13 following the selection of text for audio playback by the user using the pointing device 3, audio data which is stored in the temporary directory in the disc storage 15 is accessed and output over the bus 9 via the input/output device 19 to a digital to analog converter 27 to generate an analog audio signal to drive an audio output device 28 for playback of the audio signal selected by the user.

In the specific embodiment the audio data is stored in one or more files in the temporary directory of the disk storage 15 since the storage audio data requires a great deal of storage capacity and it is impractical to hold audio data of any length in the volatile memory 20.

In the specific embodiment the operating system operating by the processor 10 is Windows 3.1, 3.11, 95 or NT. The text processor application 13 can be any word processor such as Microsoft Word (Trade Mark), Wordperfect (Trade Mark) or Lotus Word Pro (Trade Mark). The speech recognition engine application 11 is the IBM VoiceType.

When the speech recognition engine application 11 is activated and receives audio data via the interface device 7, the speech recognition output data 24 is temporarily held in the volatile memory 20. The output data is then passed to files which are opened in the temporary directory of the disk storage 15. The audio data for each period of dictation is stored in a single file.

Also in temporary directory on the disc storage 15, two files are stored by the speech recognition engine application 11 which includes the information illustrated in tabular form in FIG. 3. For each period of dictation an audio data file, and a pair of information files are generated containing the information illustrated in FIG. 3. Each of the words recognised is identified by an identifier tag which identifies the position in the sequence of word. Also, the audio start point and audio end point of the audio component in the associated audio data file is indicated to enable the retrieval and playback of the audio component corresponding to the word. For each word, a list of alternative words and their scores is given where n is the score, i.e. the likelihood that the word is correct, and w is the word. The list of alternative words is ordered such that the most likely word appears first. Alternatives, if any, are then listed in order with the word having the highest score first and the word having the lowest score last.

The speech recognition interface application 12 receives the output of the speech recognition engine application 11 and forms link data 25 in the volatile memory 20. FIG. 4 illustrates the form of the link data for each recognised word output from the speech recognition engine 11. The speech recognition interface application 12 receives the recognised word at the head of the alternative list shown in FIG. 3 and outputs the word using the dynamic data exchange (DDE) protocol in the Windows operating system. The position of a word in the text in the text processor application 13 is determined by determining the counter number indicating the position of the first character in the text for the word. This character number is entered under the character number field. The link data 25 also includes information identifying where the audio data can be found in the files in the temporary directory of the disk storage 15. This information is provided in the tag field. The tag field will not only include the identified tag identifying the position of the audio component for a word within a file, it will also include an identification of which file contains the audio component. The next field is the word score which is an indication of the likelihood that the word has been recognised correctly. The next field is the word length field. This gives the number of characters forming the recognised word. The next field in the link data 25 is the character string forming the actual word and this is followed by the vocabulary length field which is a number indicating the number of characters in the vocabulary description string. The final field is the vocabulary description string which is a string of characters describing the vocabulary in which the word recognised by the speech recognition engine application 11 can be found in the dictionary 23.

Figure 5:
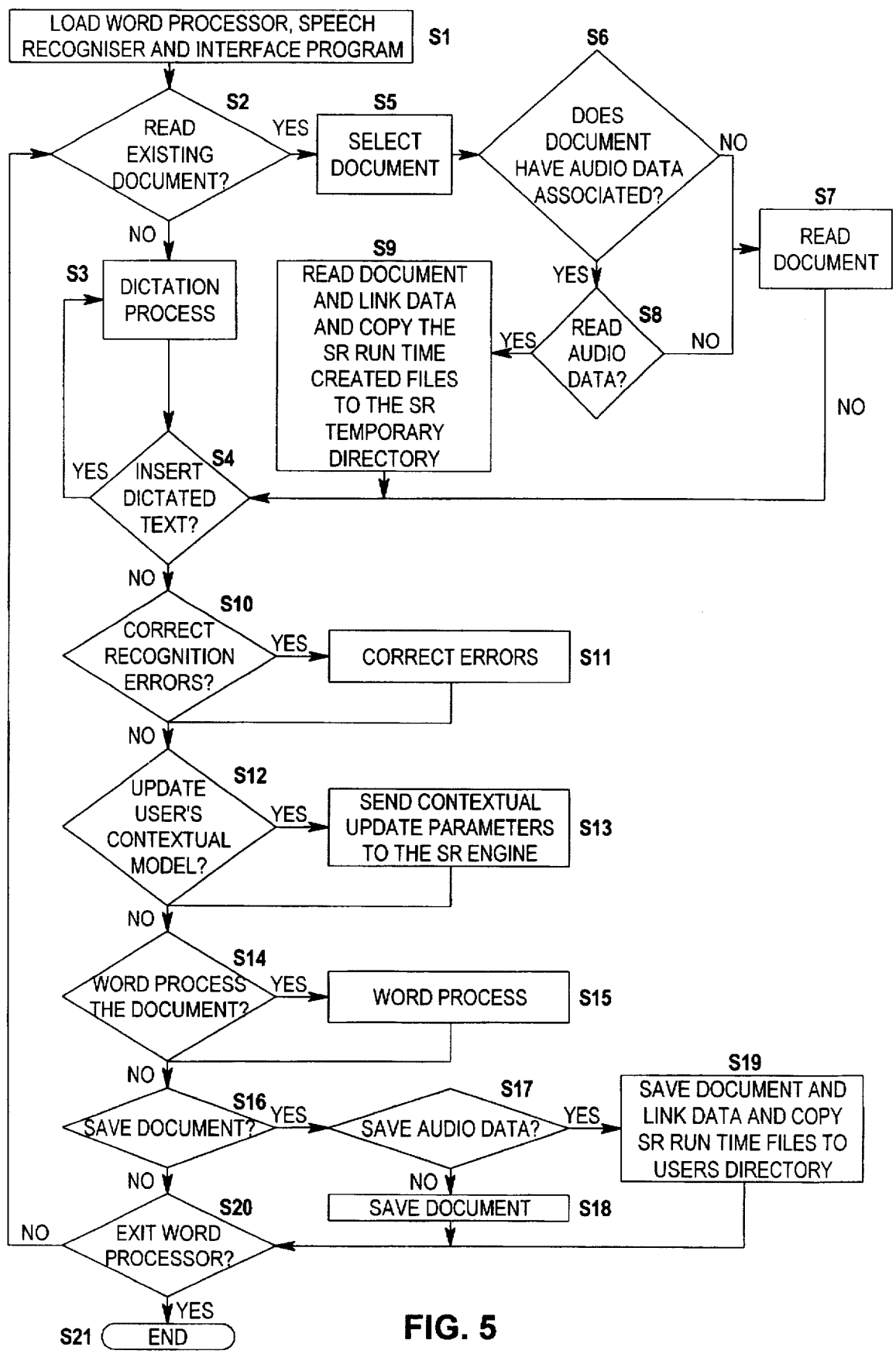
FIG. 5 is a flow chart illustrating the overall operation of the speech recognition system in accordance with one embodiment of the present invention.

FIG. 5 is an overview of the operation of the embodiment of the present invention. In step S1 the word processor application 13, the speech recognition engine application 11 and the speech recognition interface application 12 is loaded from a storage medium such as the disk storage 15. The programs can of course be loaded from any computer readable storage medium such as optical discs (CD ROM) or digital tape.

Once the programs are loaded, a user can select whether to read an existing document in step S2. If no existing document is to be read text can be entered using the dictation process step S3 which will be described in more detail hereinafter. When a passage of dictated text is complete, the dictation process is finished and in step S4 the user can decide whether to insert further dictated text. If further dictated text is to be inserted, the process returns to step S3. If no further dictated text is to be inserted then the dictation process is finished.

If in step S2 after the programs have been loaded a user requests that an existing document be read, in step S5 the document to be read is selected and in step S6 it is determined whether the document selected has audio data associated with it. If there is no audio data associated with it, i.e. it is a conventional word processor document, in step S7 the document is read and the process moves to step S4 which is a point at which the document has been loaded and the user can insert dictated text if desired.

If in step S6 it is determined that the document does have audio data associated with it, the user is given the option to read the audio data in step S8. If the user declines to read the audio data then only the document is read in step S7 and the document will be treated within the word processor as a conventional word processor document. If in step S8 the user selects to read the audio data, in step S9 the document is read together with the associated link data from the user's directory in the disk storage 15 and the speech recogniser run time created files are copied from the user's directory to the temporary directory in the disk storage 15. The document is thus open in the word processor and in step S4 the user can insert dictated text if desired.

If no more dictated text is to be inserted in step S4, in step S10 the user can decide whether to correct recognition errors in the recognised text. If in step S10 it is decided by the user that they are to correct errors then the process moves to step S11 to correct the errors as will be described hereafter.

Once the recognition errors have been corrected by the user or if the recognition error is not to be corrected by the user, the process moves to step S12 wherein the user can decide whether to update the user's contextual model. This is a second form of correction for the speech recognition process. The user model 21 comprises an acoustic model and a contextual model. The recognition errors corrected in step S11 will correct the acoustic model, i.e. the recognition errors. Once all of the recognition errors have been corrected, the contextual model can be updated in step S13 by selecting the text to be used for the update and sending the number of corrected words together with a list of the corrected words to the speech recognition engine for updating the contextual model.

In step S14 the user can then decide whether or not to word process the document in the conventional manner. If a document is to be word processed, the word processing operation in step S15 is carried out as will be described in more detail hereinafter. This word processing operation can be carried out at any time after or before the dictation process. The document being formed in the word processor can thus comprise a mixture of conventionally entered text, i.e. via the keyboard or via the insertion of text from elsewhere, and directly dictated text.

When the user has finished dictating, inserting and editing the text, in step S16 the user has the option of whether or not to save the document. If the document is to be saved, in step S17 the user is given the option of saving the document without the audio data as a conventional word processor document in step S18, or saving the document together with the link data and audio data in step S19. In step S19, in order to save the link data and audio data, the document and link data, by default, is saved in the user's directory and a copy of the speech recogniser run time created files is made in the user's directory.

Once the document has been saved, the user has the option to exit the word processor in step S20. If the word processor is exited in step S20 the process terminates in step S21, otherwise the user has the option of whether or not to read an existing document in step S2.

Figure 6:
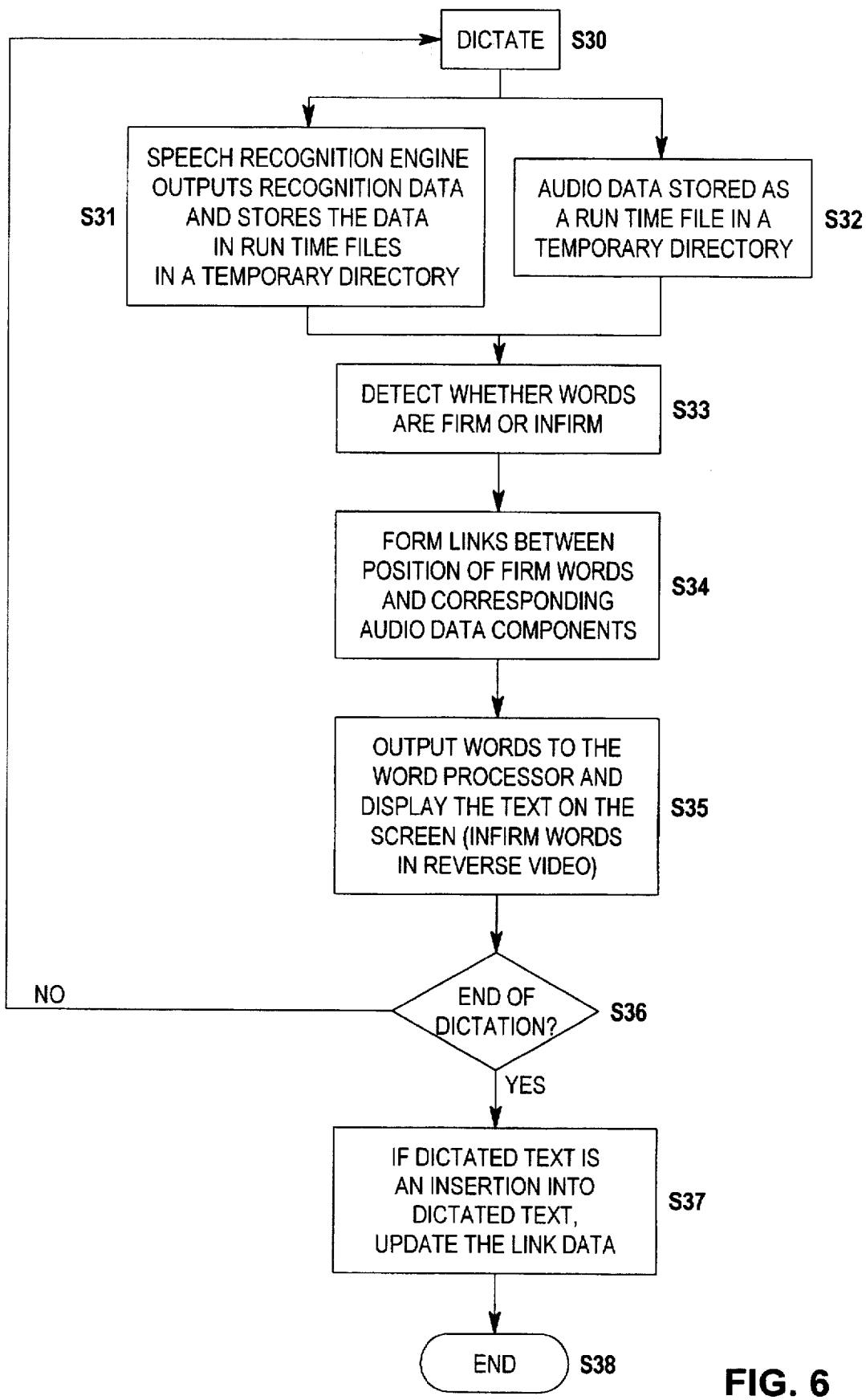
FIG. 6 is a flow diagram of the dictation process of FIG. 5.

Referring now to FIG. 6, this document illustrates the dictation process, step S3, of FIG. 5 in more detail.

In step S30 the dictation is started and in step S31 the speech recognition engine application 11 outputs speech recognition data 24 and stores the data in run time files in a temporary directory of the disk storage 15. Also, the audio data is stored in parallel as a run time file in the temporary directory in step S32. The speech recognition interface application 12 detects whether the most likely words output from the speech recognition engine application 11 are firm or infirm, i.e. whether the speech recognition engine application 11 has finished recognising that word or not in step S33. If the speech recognition engine application 11 has not finished recognising that word, a word is still output as the most likely, but this could change, e.g. when contextual information is taken into consideration. In step S34, the speech recognition interface application 12 forms links between positions of firm words and corresponding audio data components thus forming the link data 25. In step S35 the speech recognition interface application 12 outputs the words to the word processor application 13 and the text is displayed on the screen with the infirm words being displayed in reverse video format. In step S36 the process determines whether dictation is finished and if has not it returns to step S30. If dictation has finished, in step S37 it is determined whether the dictated text is inserted into previously dictated text and, if so, the link data is updated to take into consideration the change in character positions of the previously dictated words. The dictation process is then terminated in step S38.

Figure 7:
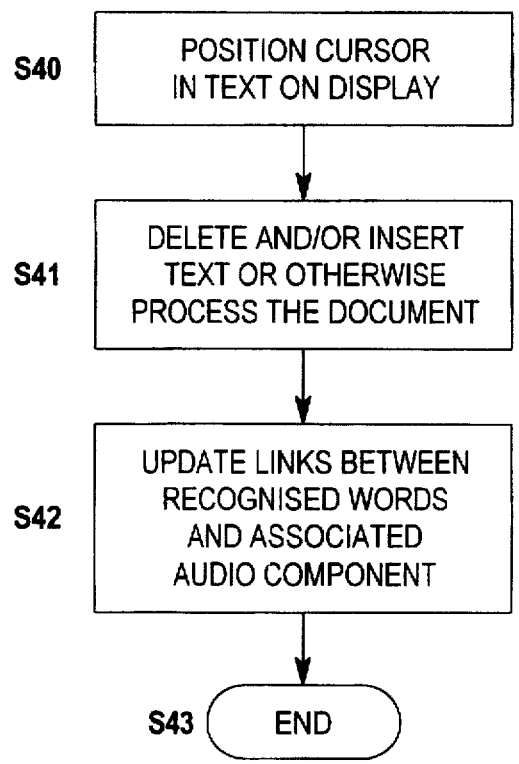
FIG. 7 is a flow diagram of the word processing process of FIG. 5.

Referring now to FIG. 7, this illustrates the word processing process of step S15 of FIG. 5 in more detail. In step S40,a user can position the cursor in the text on the display using the keyboard 2 or the pointing device 3. In step S41 the user can delete and/or insert text by, for example, typing using a keyboard or inserting text from elsewhere using conventional word processing techniques. In step S42 the speech recognition interface application 12 updates the links between the recognised words and associated audio components, i.e. the character number in the first field of the link data 25 is amended to indicate the correct character position of the word in the text. The word processing process is then terminated in step S43.

Figure 8A:
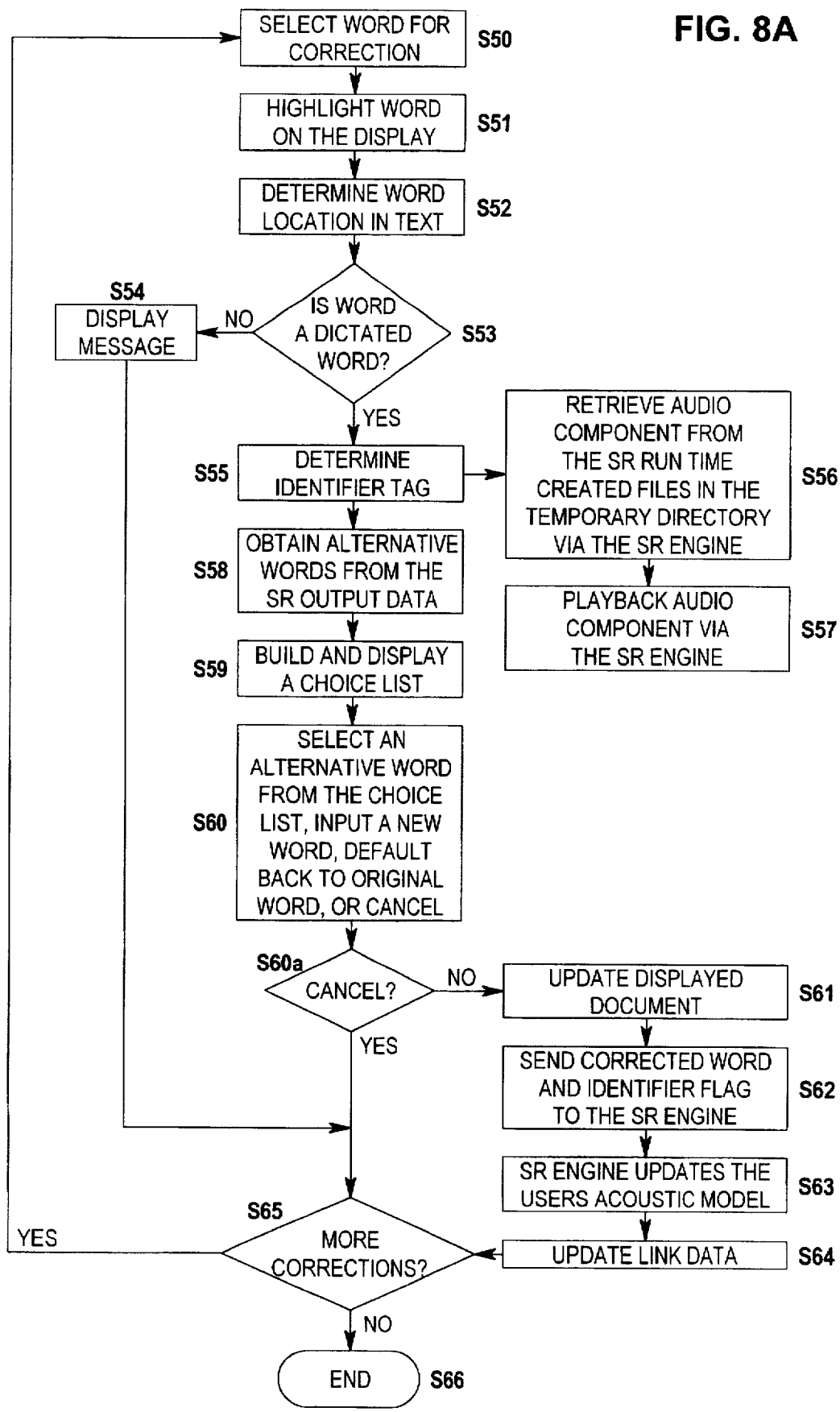
FIG. 8a is a flow diagram of the manual correction process of FIG. 5.

Referring now to FIG. 8a, this diagram illustrates a manual method of carrying out the error correction of step S11 of FIG. 5. In step S50 the user selects a word which is believed to be incorrectly recognised for correction. The selected word is then highlighted on the display in step S51 and in step S52 the speech recognition interface application 12 determines the word location in the text. In step S53 it is determined whether the word is a dictated word or not by comparing the word location with the link data 25. If the word is not a dictated word a message is displayed informing the user that the word is not a dictated word in step S54 and in step S65 the system waits for more corrections. If the word is a dictated word, in step S55 the speech recognition interface application 12 determines the identified tag for the selected word using the link data 25 and the speech recognition output data. The audio component is then retrieved from the speech recognition run time created files in the temporary directory view the speech recognition engine application 11 in step S56 and in step S57 the audio component is played back via the speech recognition engine application 11. In step S55, once the identified tag has been determined, in addition to retrieval of the audio component, the alternative words from the speech recognition output data in step S58 is obtained and the choice list is built and displayed on the display in step S59. In step S60 a user can select an alternative word from the choice list, input a new word, default back to the original word or cancel if the original word is correct or the word was selected for correction in error. If a user cancels the operation in step S60a the process proceeds to determine whether more corrections are required. If the user does not cancel the operation in step S61 the displayed document is updated and in step S62 the corrected word and the corresponding identifier flag is sent to the speech recognition engine application 11. In step S63 the speech recognition engine application 11 updates the user's acoustic model within the user model 21. In step S64 the link data is updated, e.g. if the correct word has more characters in it than the replaced word, the character position of all subsequent words will change and thus the link data will need to be updated. In step S65, if more corrections are required the user will in step S50 select another word for correction and repeat the process. Otherwise the correction process is finished and terminates in step S66.

Figure 8B:
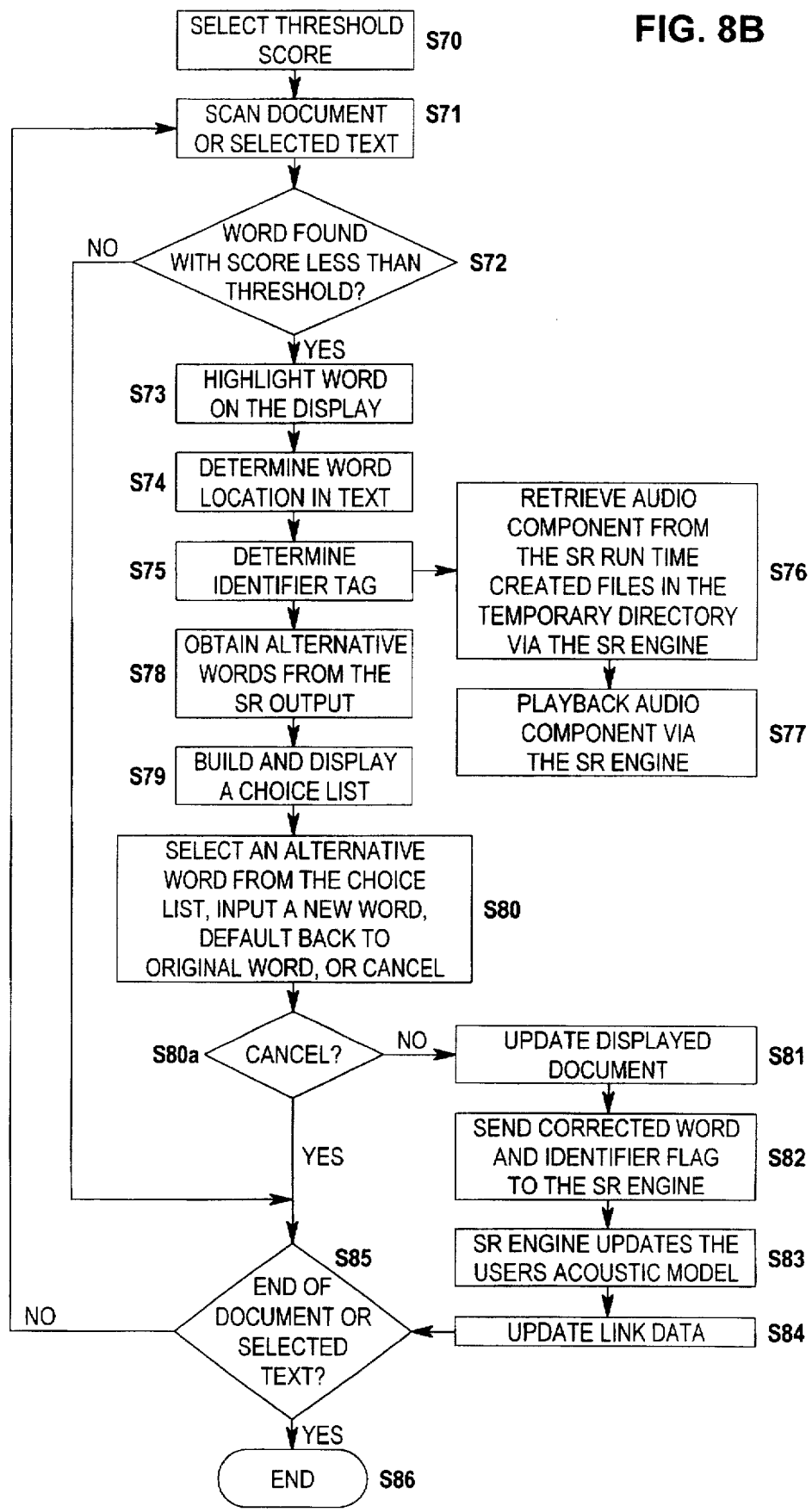
FIG. 8b is a flow diagram of the automatic correction process of FIG. 5.

Referring now to FIG. 8b, this diagram illustrates a method of automatically detecting possible recognition errors in the text. In step S70 the user selects a threshold score to be used to detect possible recognition errors. In step S71 the document or selected text is scanned to compare the threshold score with the score for each of the words. In step S72 the document is scanned to compare the threshold score with the score for the next word. If in step S72 it is found that the score for the word is greater than the threshold, the process proceeds to step S85 where it is determined whether the end of the document has been reached. If it is not the end of the document then the process returns to step S71 to compare the score for the next word with the threshold score. If in step S72 it is determined that the score for the word is less than the threshold score, the word is highlighted on the display in step S73. In step S74 the speech recognition interface application 12 determines the word location in the text and in step S75 the identifier tag for the word is determined. In step S76 the audio component is retrieved from the speech recognition run time created files in the temporary directory via the speech recognition engine application 11 for playback of the audio component via the speech recognition engine application 11 in step S77. Once the identifier tag is determined in step S75, in step S78 the alternative words for the word having the score less than the threshold is obtained from the output of the speech recogniser engine application 11. In step S79 a choice list is built and displayed on the display. The choice list comprises the list of alternative words displayed alphabetically. In step S80 a user can select an alternative word from the choice list, input a new word, default back to the original word, or cancel if the original word is thought to be correct. If a user cancels the operation in step S80a, the process proceeds to step S85 to determine whether the end of the document or selected text has been reached. If the user does not cancel the operation, in step S81 the displayed document is updated and in step S82 the corrected word and identifier flag is sent to the speech recogniser engine application 11. In step S83 the speech recognition engine application 11 updates the user's acoustic model in the user model 21. In step S84 the link data is updated, e.g. if the correct word contains more or less than characters than the original word, the character number indicating the position of the first character of all of the following words will change and thus the link data for these words must be updated. In step S85 it is determined whether the end of the document, or the selected text, has been reached. If so, the process is terminated in step S86, otherwise the process returns to step S71 to continue scanning the document or selected text.

Thus in the process described with reference to FIGS. 5 to 8, the user is able to harness the output of the speech recognition engine to maintain links between the words in the text and the corresponding audio components in the audio data even if the words are moved or are dispersed with non dictated text or text which has been dictated at some other time. Link data effectively acts as a pointer between the position of the text in the document and the position of the corresponding audio component in the audio data. In this way the dictated text can be ordered in any way and mixed with non dictated text without losing the ability to play back the audio components when selected by a user.

Also, since not only audio data but also the link data is stored in non-volatile storage such as the disk storage 15, the user is able to reopen a document and play back the corresponding audio data. This enables a user to dictate a document and store it without correction thereby allowing correction at a later date. i.e. delaying the correction. When the document link data and audio data is read, the system returns to a state as if the text had just been dictated. The text can be corrected and the corrections can be fed back to the speech recognition engine to update the user model 21.

Figure 9A:
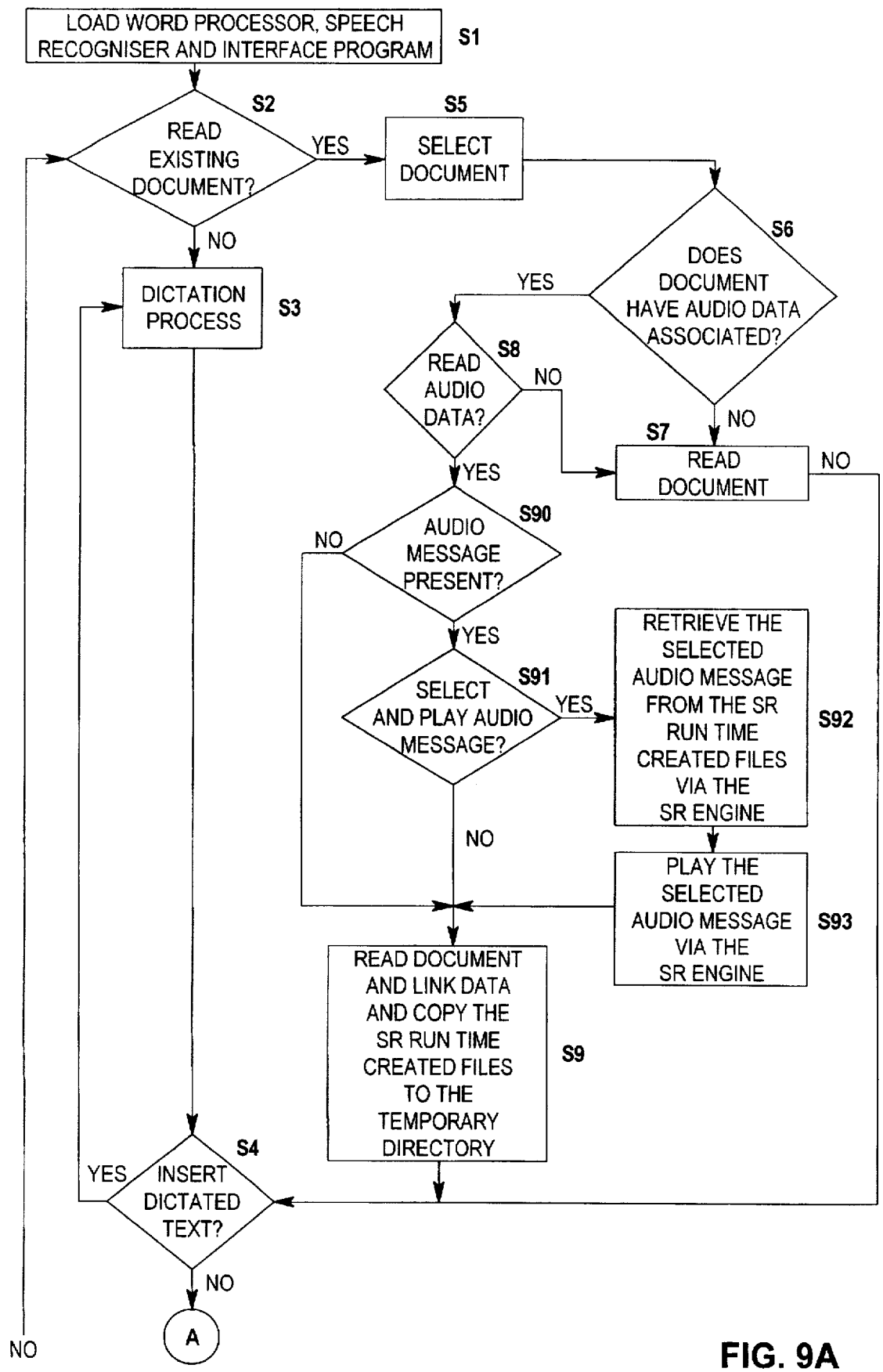
FIG. 9A is a flow diagram of the overall operation of the speech recognition system in accordance with another embodiment of the present invention in which audio messages can be played.
Figure 9B:
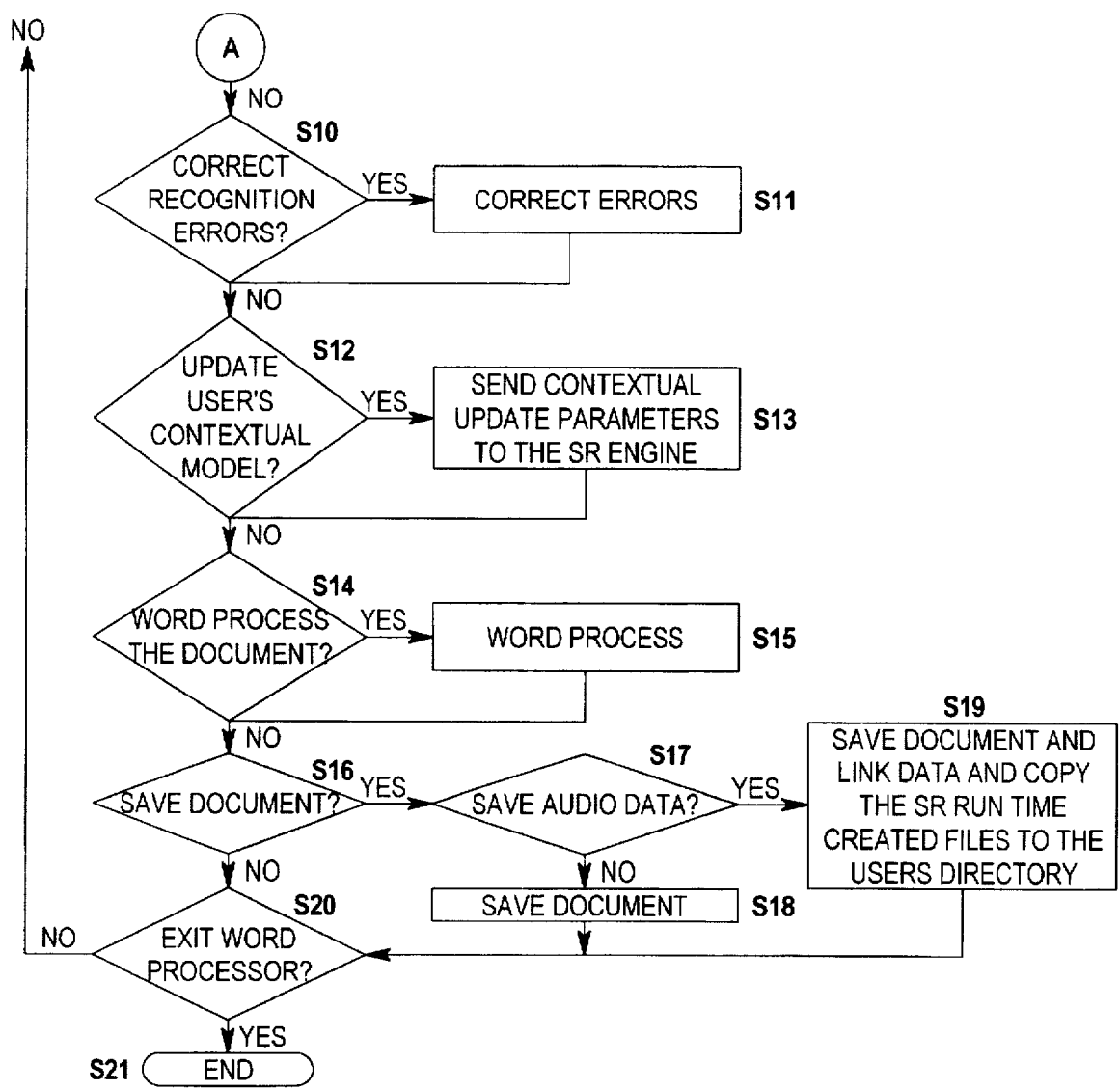
FIG. 9B is a continuation of the flow diagram of FIG. 9A.

Referring now to FIGS. 9A and 9B, there is illustrated a flow diagram illustrating the feature of another aspect of the present invention. In FIGS. 9A and 9B, many steps are the same as those illustrated in FIG. 5 and thus the same references are used. In this aspect of the present invention, when audio data is associated with a document (S6) and a user selects to read audio data (step S8), the system determines whether there are any audio messages associated with the document in step S90.

If there are no audio messages associated with a document the process proceeds to step S9 where the document and link data is read and the speech recognition run time created files are copied from the user's directory to the temporary directory and the system proceeds as described with regard to FIG. 5. If however there are one or more audio messages associated with the document, the user is given the option to select the audio message which is to be played in step S91. If an audio message is not to be played then the process proceeds to step S9. If however the user selects to play a selected audio message, in step S92 the selected audio message is retrieved from the speech recognition run time created files via the speech recognition engine applications 11 and in step S93 the selected audio message is played via the speech recognition engine application 11. The process then proceeds to step S9 as described with reference to FIG. 5. Although FIGS. 9A and 9B illustrates the audio note only being playable at a particular time, an audio note can be played at any time during the creation of a document or after a document has been read.

Figure 10:
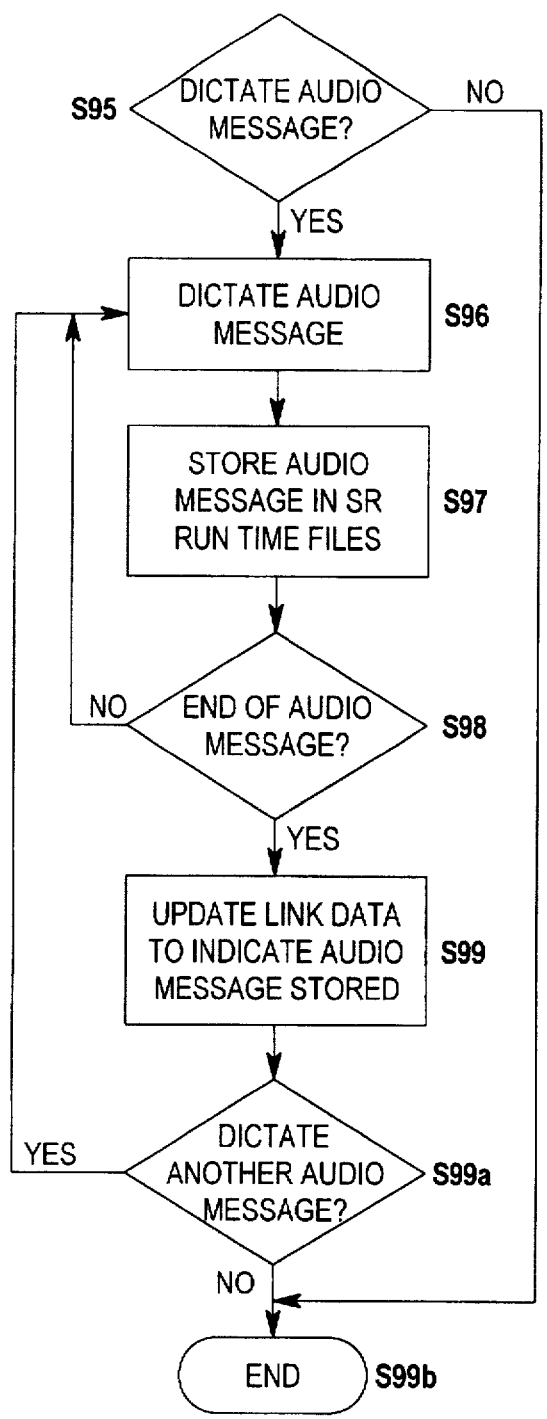
FIG. 10 is a flow diagram of an optional step for the dictation of an audio message in the sequence of FIG. 9.

In FIG. 10 there is illustrated a procedure for dictating one or more audio messages which can be carried out at any time. In step S95 the user can elect whether or not to dictate an audio message to be associated with a document to be created. If no audio message is to be created the process terminates in step S99b. If an audio message is to be created in step S96 the dictation of the audio message is initiated and in step S97 the audio message is stored in the speech recognition run time files. In step S98 it is determined whether the dictation of the audio message has finished and if not the process returns to step S96. If the audio message has finished in step S99 the link data is updated to indicate that the document includes an audio message and in step S99a another audio message can be selected to be dictated and the process returns to step S96. Otherwise the process can be terminated in step S99b.

This aspect of the present invention illustrated in FIGS. 9A, 9B, and 10 allows for a user to dictate one or more messages which is stored in association with a document. During the dictation of an audio message no recognised text is input to the text processor application 13. This is achieved in the specific embodiment by failing to pass the text to the text processor application 13. This could alternatively be achieved by disabling the recognition capability of the speech recogniser engine application 11 so that only the audio data is stored.

In the specific example the audio message merely comprises a normal audio data file which has the speech recognition data of FIG. 3 in corresponding run time files and which is ignored.

As can be seen with regard to FIG. 9, when a user opens a document the link data is examined to determine whether there are any audio messages associated with a document and if so an option is displayed to allow the user to select and play a message. If the user selects to play the message the link data identifies the audio data file containing the audio message which is retrieved and played back via the speech recognition engine 11.

This aspect of the present invention can be used without the features of correcting the user model and can in its simplest form comprise a method of recording and digitising audio messages and storing the audio messages with a document which could simply be created in a conventional manner without involving speech recognition. The audio message allows for instructions or reminding information to be attached to a document in audio form.

Figure 11:
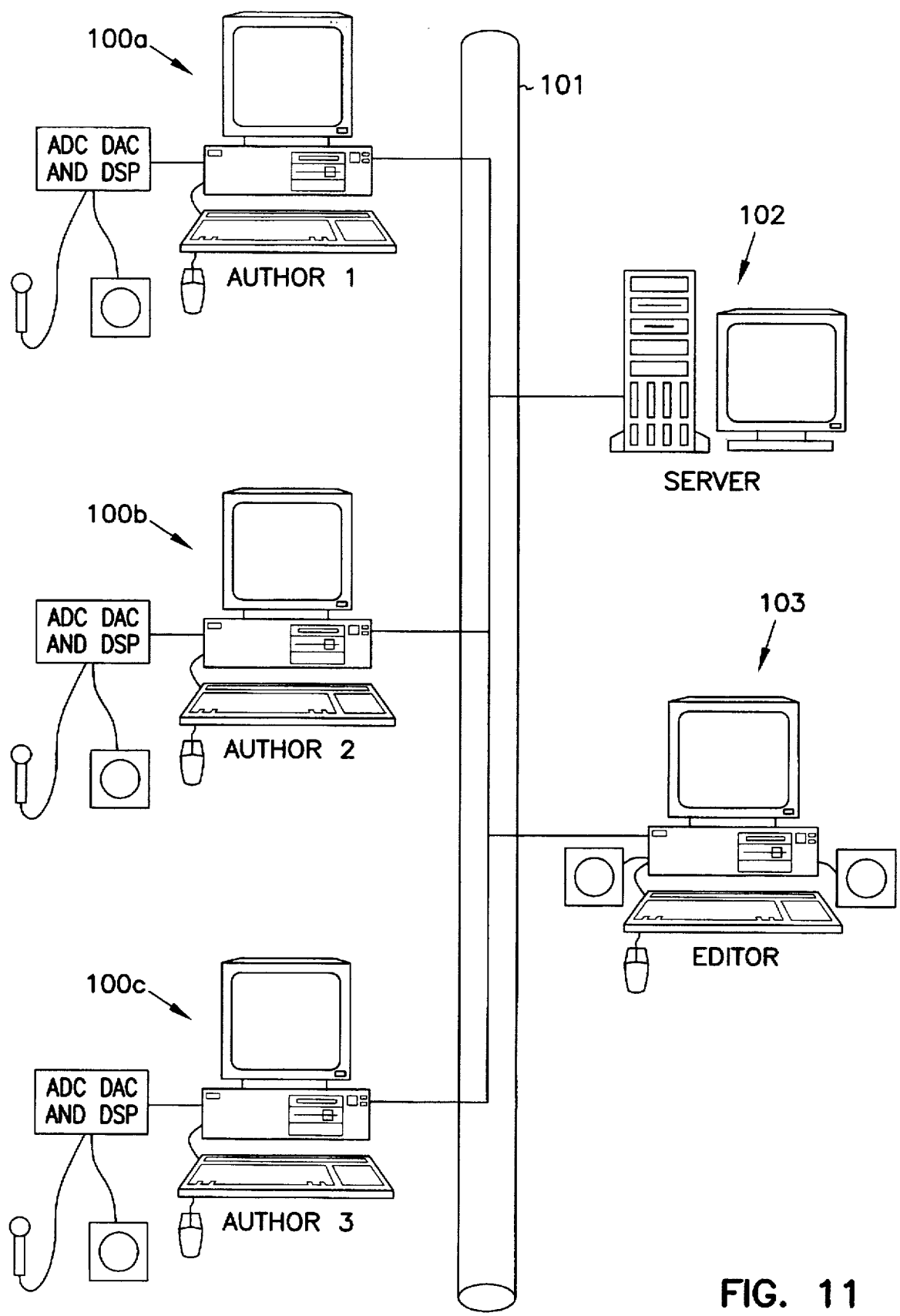
FIG. 11 is a schematic drawing of a network of speech recognition systems comprising author work stations wherein the network is provided with an editor work station which can access and edit documents in the author work stations.

Another aspect of the present invention will now be described with reference to FIGS. 11 to 15. In this aspect of the present invention the correction of the incorrectly recognised words in a dictated passage of text can be carried out on a machine which is separate to the machine containing the speech recognition engine 11 and user model 21. In FIG. 11 there is illustrated a network of author work stations 100a, 100b and 100c which comprise the system as described with regard to FIGS. 1 to 10. The author work stations 100a, 100b and 100c are connected via a network 101 under the control of a network server 102 to an editor work station 103. The network 101 can comprise any conventional computer network such as an ethernet or token ring.

Although in FIG. 11 access to the files of the author work stations is achieved via the network 101, any method of obtaining copies of the documents, associated link data files, and associated speech recognition run time created files can be used. For instance, the documents could be transferred by copying the relevant files on to a computer readable medium such as a floppy disc which can be read by the editor work station and amended. Also correction files (to be explained hereinafter) can be stored on the disc and the disc can be re-read by the author work station for updating of the user model 21 by the speech recognition engine application 11. Further, although three other work stations and a single editor work station are illustrated any number can be used on the network.

Figure 12:
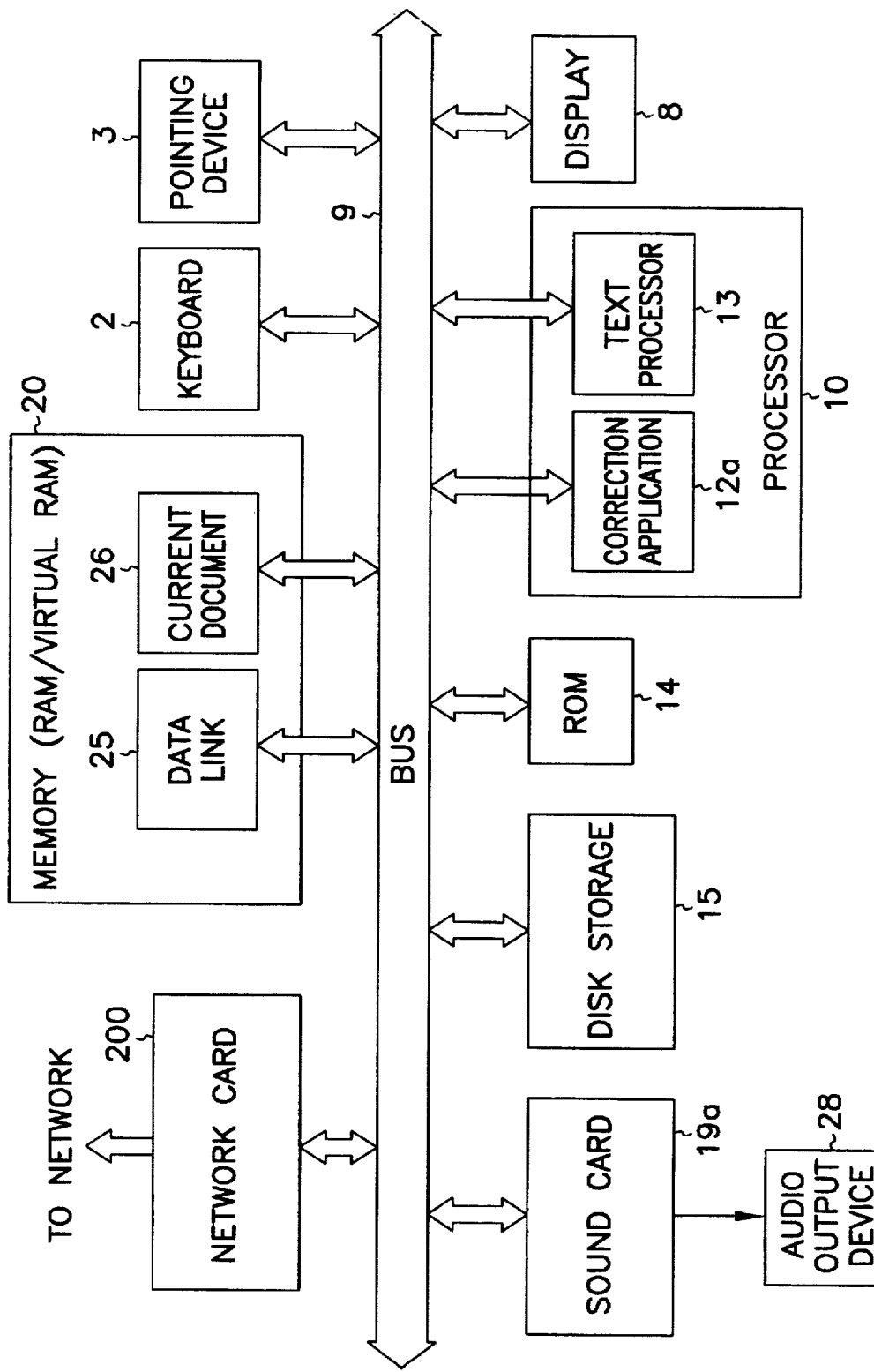
FIG. 12 is a schematic diagram of the internal structure of the editor work station.

FIG. 12 illustrates the architecture of the editor work station 103. Like reference numerals in FIG. 12 to the reference numerals of FIG. 2 represent like components. In the editor work station 103 there is no user model 21, language model 22, dictionary 23 or SR output data 24 in the memory 20. Also the processor 10 does not include the speech recognition engine application 11 and the speech recognition interface application 12 is replaced with the correcting application 12a. In the disk storage 15 there is no partition of the disk into the temporary directory and the user's directory. The documents can however be stored locally into a disk storage 15. The editor work station differs from the author work station further in that there is no input/output device 19, digital signal processor 18, and analogue to digital converter 17, audio input device 16, and digital to analogue converter 27. Instead the audio output device 28 (loudspeaker or loudspeakers) receives its output from a conventional multimedia sound card 19a.

The editor work station 103 is also provided with a network card 200 to interface the editor work station 103 with the network 101 to allow for the document, link data and speech recognition run time created files to be read from a correspondence path. Of course, although not illustrated in FIG. 2, the author work station 100a, 100b and 100c will include a similar network card 200 in this embodiment.

Figure 13:
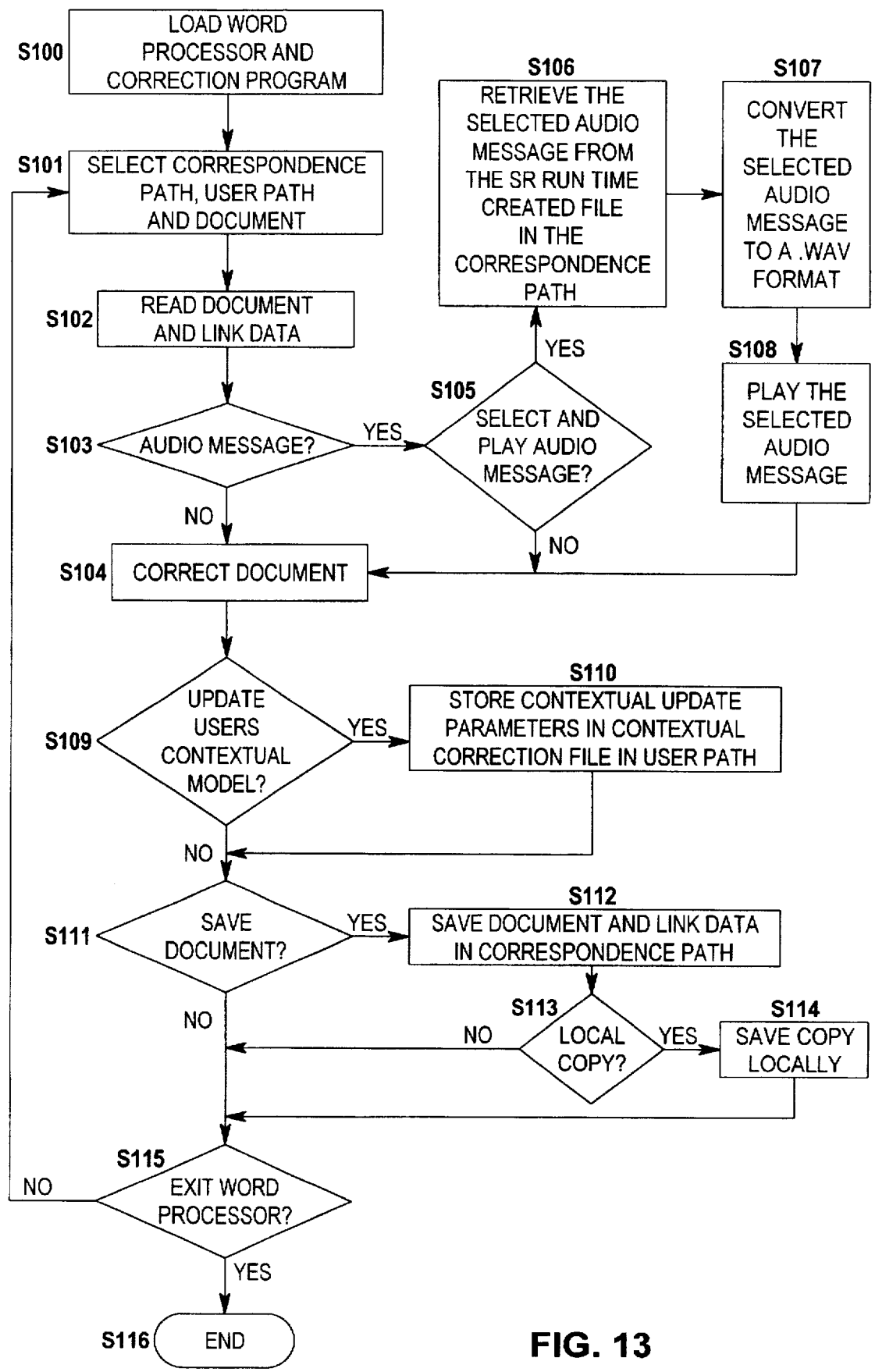
FIG. 13 is a flow diagram of the overall operation of the operation of the editor work station of FIG. 11.

FIG. 13 is a flow diagram of the operation of the editor work station in accordance with the specific embodiment of the present invention. In step S100 the word processor application and a correction application is loaded. The correction application comprises a modified form of the speech recognition interface application. In step S101 the user selects a correspondence path, a user path and a document for correction. The correspondence path is the directory in which the user has saved the document, the link data file, and the speech recognition run time created files. The user path is the directory in which the speech recognition data, specifically the user model 21, is stored. In step S102 the document and link data file is read. In step S102 the document and link data file can simply be read over the network or it can be copied so that the editor work station 103 has a local copy. If a local copy is made, it is important that when corrections are made the corrected document is stored in the correspondence path together with the amended link data file. In step S103 the link data determines whether there are any audio messages associated with the read document. If there are no audio messages the process proceeds to step S104 for the correction of the document. If an audio message is present in step S105 the user is given an option to select the audio message for playing. If an audio message is not to be played the process proceeds to step S104. If an audio message is to be played the selected audio message is retrieved from the speech recognition run time created files in step S106 and in step S107 the selected audio message is converted to a conventional sound format, e.g. .WAV. In step S108 the audio message is then played through the conventional sound card 19a and loud speakers 28 and the process then proceeds to step S104. Once the document has been corrected, the details of which will be described in more detail hereinafter, in step S109 the editor is given the option as to whether to update the user's contextual model. If the editor does not wish to update the user's contextual model the process proceeds to step S111 where the editor is given the option as to whether or not to save the document. If the user's contextual model is to be updated in step S110 the user selects text containing corrections whereupon context update parameters are stored in a contextual correction file in the user path. The contextual update parameters include the number of corrected words and a list of the corrected words. The process then proceeds to step S111. If the document is to be saved, in step S112 the document and associated link data is stored in the correspondence path and in step S113 the editor is given the option as to whether to store a copy locally in the editor work station 103 in step S114. In step S115 the editor can then either exit the word processor, in which case the process terminates in step S116, or select another document by returning to step S101.

Figure 14A:
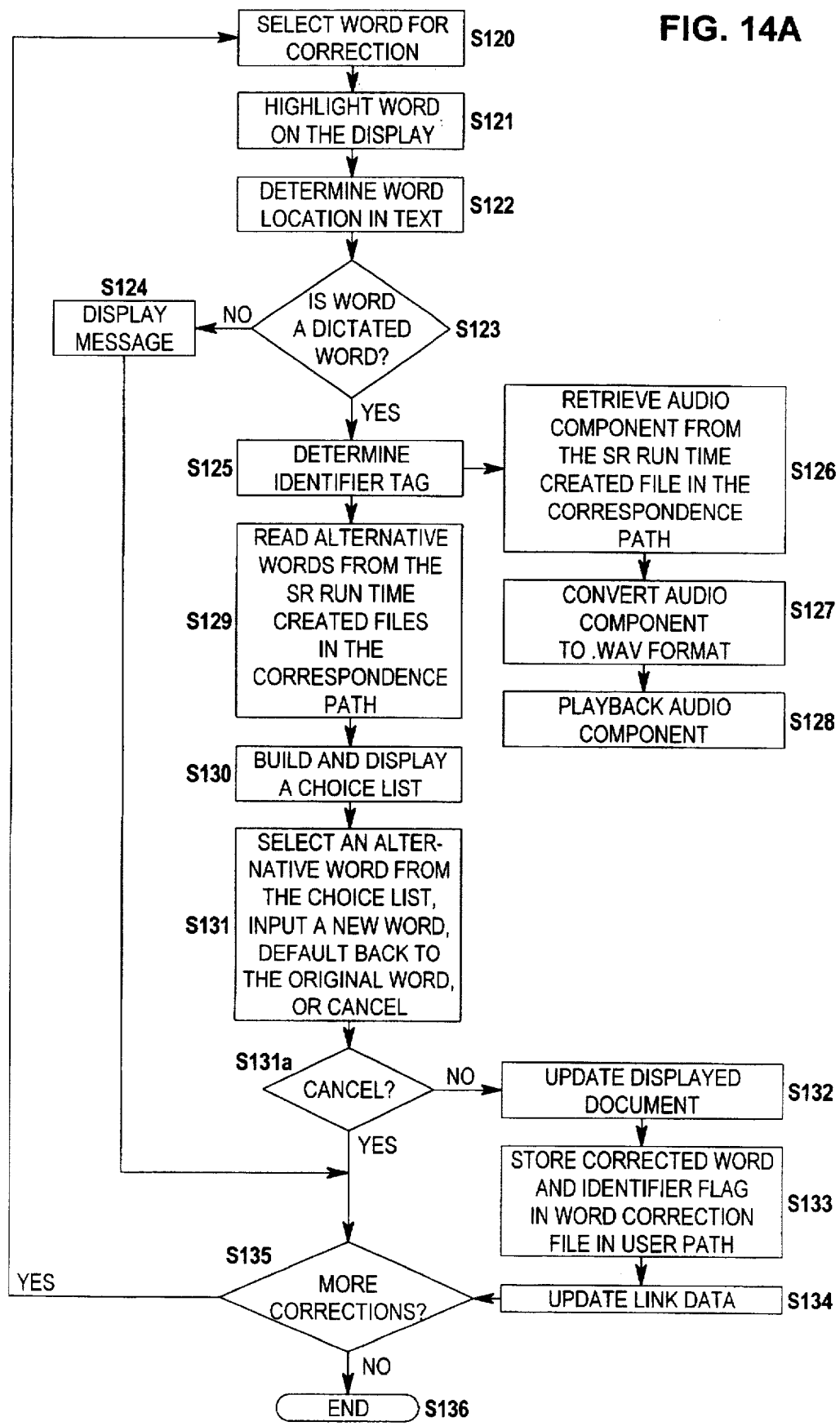
FIG. 14a is a flow diagram of the manual correction process of FIG. 13.

Referring now to FIG. 14a, this document is a flow diagram of the method of manually correcting the document corresponding to step S104 of FIG. 13. In step S120 the editor selects a word for correction and in step S121 the word is highlighted on the display. In step S122 the correction application determines the word location in the text and in step S123 it is determined whether the word is a dictated word or not by comparing the word location with the link data 25. If the word is not a dictated word a message is displayed informing the editor that the word is not a dictated word in step S124 and in step S135 the system awaits further corrections. If the word is a dictated word in step S125 the identified tag is determined. In step S126 the audio component from the speech recognition run time created file is retrieved from the correspondence path and the audio component corresponding to the selected word is converted to a conventional audio format (.WAV) in step S127. The audio component is then played back using the conventional multimedia sound card and loudspeakers in step S128.

Once the identified tag is determined in step S125 the alternative words are read from the speech recognition run time created files in the correspondence path in step S129 and in step S130 a choice list is built and displayed. The choice list comprises the alternative words listed alphabetically for ease of use. In step S131 the editor can select an alternative word from the choice list, input a new word, default back to the original word, or cancel if the original word is considered to be correct or the editor incorrectly selected the word. If an editor cancels the operation in step S131a the process proceeds to step S135 to determine whether more corrections are required. If the user does not cancel the operation, in step S132 the displayed document is updated and in step S133 the corrected word and identifier flag is stored in a word correction file in the user path. In step S134 the link data is updated e.g. if the correct word is of different length to the replaced word, the character number identifying the position of the first character of each of the proceeding words will be changed and thus the link data for all of the following words must be changed. In step S135, if the user makes no more corrections, the process ends at step S136 otherwise the user can select another word in step S120.

Figure 14B:
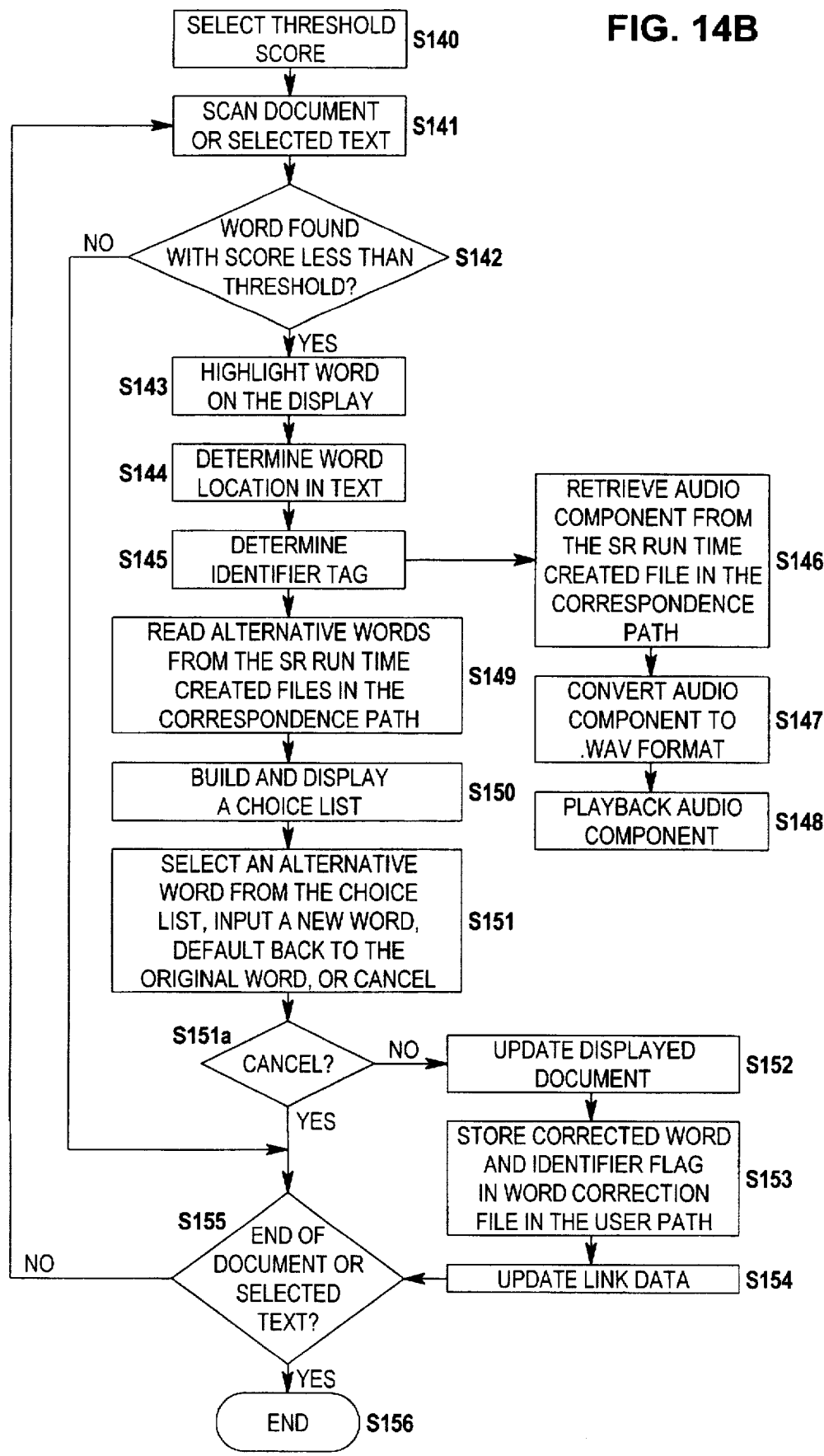
FIG. 14b is a flow diagram of the automatic correction process of FIG. 13.

FIG. 14b is a flow diagram of an automatic method of correcting recognition errors corresponding to the correction step S104 in FIG. 13. In step S140 the editor can select the desired threshold score for the automatic correction process. In step S141 the document or selected text is scanned to compare the score of the next word with the threshold score. In step S142 if the score for the word is greater than the threshold, in step S155 it is determined whether it is the end of the document or selected text and if it is the process terminates in step S156. Otherwise the scanning of the document in step S141 continues for each word in the selected text or until the end of the document is reached. If in step S142 it is determined that the score for a word is less than the threshold an in step S143 the word is highlighted on the display and in step S144 the word location in the text is determined. In step S145 the identifer tag for the word is determined from the link data 25 and in step S146 the audio component is retrieved from the SR run time created files. In step S147 the audio component is converted to a standard audio format (.WAV format) and in step S148 the audio component is played back using the conventional multimedia sound card 19a and loudspeakers 28.

When the identifer tag is determined for the word in step S145 in step. S149 the alternative words from the speech recognition run time created files can be read in the correspondence path and in step S150 a choice list can be built and displayed. The choice list comprises a list of the alternative words in alphabetical order. In step S151 the editor can select an alternative word from the choice list, input a new word, default back to the original word, or cancel if it is considered that the original word was correct. If the editor cancels the operation in step S151 the process proceeds to step S155 to determine whether the end of the document or selected text has been reached. If the editor does not cancel the operation, in step S152 the displayed document is updated and in step S153 the corrected word and identifer flag are stored in a word correction file in the user path. In step S154 the link data 25 is updated e.g. if the correct word has a different length to the original word the position of the following words will change and thus the link data needs to be updated. In step S155 it is determined whether it is the end of the document, or selected text, and if so the process terminates in step S156.

Figure 15:
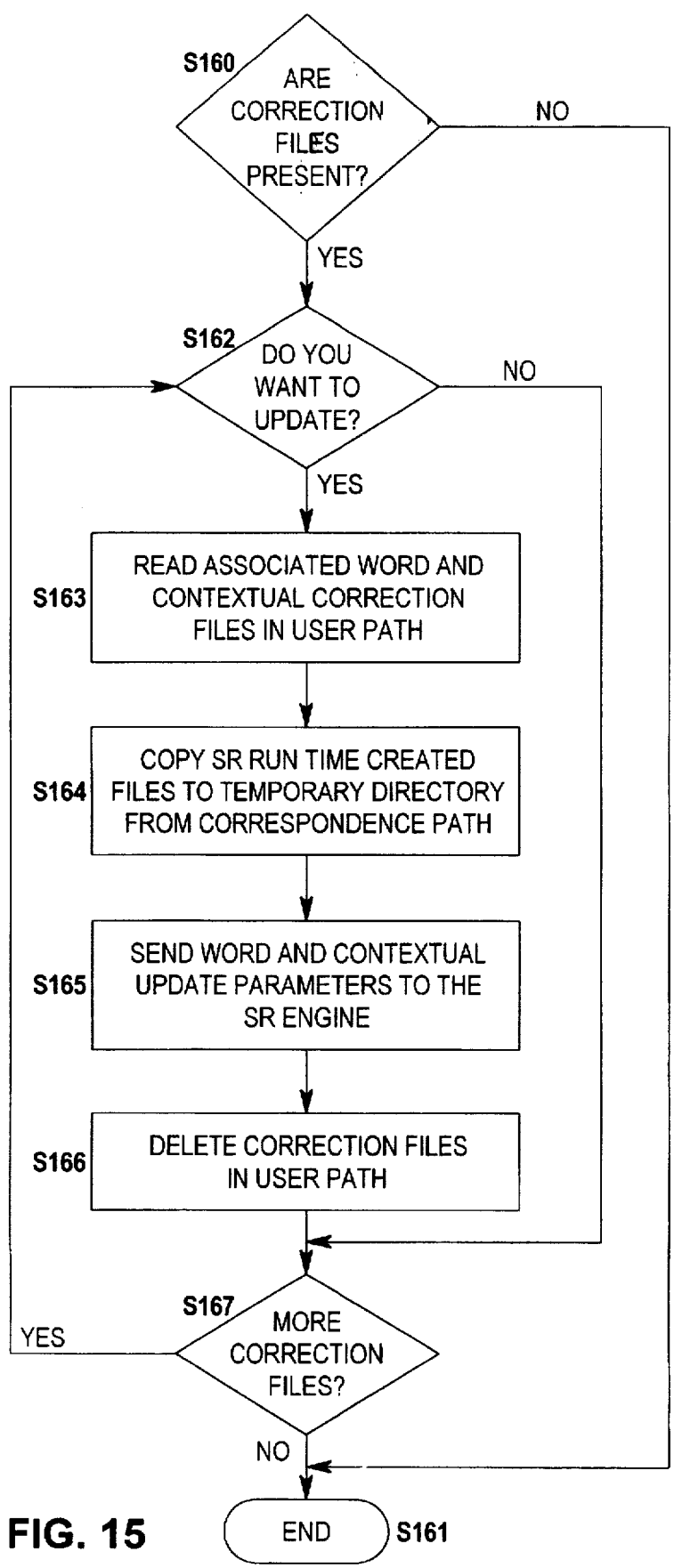
FIG. 15 is a flow diagram of the speech recognition model update process which is carried out by the author work stations after corrections have been made to recognised text by the editor work station.

Referring now to FIG. 15, this is a flow diagram of the additional steps which are carried out at a networked author work station when the speech recognition engine application and the speech recognition interface application is loaded. In step S160 the speech recognition interface application detects whether there are any word correction files or contextual correction files present in the user path. If no correction files are detected at present then the process terminates in step S161 allowing the user to continue to step S2 in FIGS. 5 or 9A. If correction files are detected to be present in step S160 the author is given the option as to whether to carry out updating of the user model 21 at this time for the selected correction files in step S162. If no updating is to be carried out for the selected correction files the process proceeds to step S167 to determine if there are more correction files present. If the author selects to carry out the updating of the user model 21 using the selected correction files, in step S163 the associated word and/or contextual correction files are read from the user path. In step S164 the speech recognition run time created files are copied from the correspondence path to the temporary directory and in step S165 the word and contextual update parameters are sent to the speech recognition engine application 11 by the speech recognition interface application 12. In step S166 the read correction files are then deleted in the user path. In step S167 it is then determined whether there are any more correction files present in the user path and if so the user is given the option as to whether to update using these files in step S162. If in step S167 there are no more correction files present then the process terminates in step S161 allowing the user to proceed to step S2 in FIGS. 5 or 9A.

Although in step S162 the author can select each associated word and contextual correction file for updating, the author may also be given the opportunity to elect for the updating to be carried out for all of the correction files present in the user path.

This aspect of the present invention illustrated in FIGS. 11 to 15 allows an author to dictate documents, save them and delegate correction to an editor by a separate machine. The corrections made by the editor are then fed back to update the author's user model to increase the accuracy of the speech recognition thereafter. However, since the author's user model is not copied, there is no danger of there being more than one copy of the user model whereby one of the copies could be out of date. Also, since the editor does not have access to the author's user model, the corrections being carried out by the editor does not prevent the author from continuing to use the speech recognition engine application which requires access to the user model. By delegating the correction to the editor whereby updates are generated in files, dictation by the author and correction by the editor can be carried out in parallel.

The delegated correction feature is enhanced by the provision of the audio note capability allowing an author to dictate instructions to the editor to be attached to the document to be edited. The audio message capability can not only be used in conjunction with the delegated correction facility, but can also be used on its own simply to provide audio messages with a document.

The delegated correction system also provides a cost reduction for users since the editor need not be supplied with the speech recognition software and system components.

The editor work station 103 can simply comprise a standard multimedia PC. It is of course possible to provide a plurality of such editor work stations in the network to serve any number of author work stations.

The delegated correction system can also operate without a network by physically moving files between the author and editor work stations on computer readable storage media such as floppy disks.

Although in the embodiments described hereinabove word processing is described as occuring after dictation, word processing of the document can take place at any time.

Further, although in the embodiments the recording and playing of audio messages is described as occuring at specific points in the process they can be recorded or played at any time.

What has been described hereinabove are specific embodiments and it would be clear to a skilled person in the art that modifications are possible and the present invention is not limited to the specific embodiments.

What is claimed is:

1. Data processing apparatus comprising:

input means for receiving recognition data from a speech recognition engine and corresponding audio data, said recognition data including a string of recognised words and audio identifiers identifying audio components corresponding to each recognised word;

storage means for storing said audio data received from said input means;

interface application program means comprising means for receiving the input recognised words, means for placing the recognised words into positions in text in a processing application program means to allow the processing of the recognised words to change the positions of the recognised words to form a processed word string, means for determining the positions of the recognised words in said processing application program means, means for monitoring changes in the positions of the recognised words, and means for forming link data linking the audio data to the recognised words, said link data comprising the audio identifiers and the determined positions of corresponding recognised words, said interface application program means including means for updating said link data in response to monitored changes in positions of the recognised words;

display means for displaying the recognised words received and processed by said processing application program means;

user operable selection means for selecting at least one word in the displayed words, said interface application program means including means for identifying any audio components, if present, which are linked to the at least one selected word; and audio playback means for playing back any identified audio components in the order of the word positions in the word string or the processed word string.

2. Data processing apparatus as claimed in claim 1 wherein said storage means also stores the recognised words and the link data, the apparatus including storage reading means for reading the stored recognised words into said processing application program means and for reading the stored link data for use by said interface application program means.

3. Data processing apparatus as claimed in claim 1 including user operable correction means for selecting a displayed recognised word which has been incorrectly recognised; correction audio playback means for controlling said audio playback means to play back any audio component corresponding to the selected word to aid correction; and speech recognition update means for sending the corrected word and the audio identifier for the audio component corresponding to the corrected word to the speech recognition engine.

4. Data processing apparatus as claimed in claim 3 wherein said recognition data includes alternative words, said display means including means to display a choice list comprising the alternative words, and said selecting and correcting means includes means to select one of the alternative words or to enter a new word.

5. Data processing apparatus as claimed in claim 1 wherein said audio identifiers comprise a list of positions of the corresponding audio components in the audio data.

6. Data processing apparatus as claimed in claim 5 wherein said word string is formed of a plurality of separately dictated passages of words, said storage means stores said audio data for each dictated passage of words in a separate file, and said memory means stores a list identifying the files and positions in the files of the audio components in said audio data corresponding to the word locations in the word string.

7. Data processing apparatus as claimed in claim 1 wherein said recognition data includes recognition status indicators to indicate whether each recognised word is a word finally selected as recognised by said speech recognition engine or a word which is the most likely at that time but which is still being recognised by said speech recognition engine, the apparatus including status detection means for detecting said recognition status indicators, and display control means to control said display means to display words which are still being recognised differently to words which have been recognised, said interface application program means being responsive to said recognition status indicators to link the recognised words to the corresponding audio component in the audio data.

8. Data processing apparatus as claimed in claim 1 including contextual update means operable by a user to select recognised words which are to be used to provide contextual correcting parameters to said speech recognition engine, and to send said contextual correcting parameters to said speech recognition engine.

9. Data processing apparatus as claimed in claim 1 wherein said recognition data includes a likelihood indicator for each word in the word string indicating the likelihood that the word is correct, and said link means stores the likelihood indicators, the apparatus including automatic error detection means for detecting possible errors in recognition of words in the recognised words by scanning the likelihood indicators in said link means for the recognised words and detecting if the likelihood indicator for a word is below a likelihood threshold, whereby said display means highlights the word having a likelihood indicator below the likelihood threshold;

second user operable selection means for selecting a word to replace an incorrectly recognised word highlighted in the recognised words; and correction means for replacing the incorrectly recognised word with the selected word to correct the recognised words.

10. Data processing apparatus as claimed in claim 1 including file storage means for storing the recognised words in a file;

means for selectively disabling one of the receipt of the recognised words by said processing application program means and the recognition of speech by said speech recognition engine for a period of time, means for storing the audio data for the period of time in said storage means as an audio message associated with the file; and storage reading means for reading said file for input to said processing application program means, and for reading said audio message for playback by said audio playback means.

11. Data processing apparatus as claimed in claim 10 wherein said storage reading means is controllable by a user to read said audio message at any time after said file has been input to said processing application program means until said processing application program means is no longer processing said file.

12. Data processing apparatus as claimed in claim 1 wherein said user operable selection means is operative to allow a user to select to playback the audio data for the most recent passage of dictated words, or to select words and play back the corresponding audio components.

13. Data processing apparatus as claimed in claim 1 wherein said interface application program means is operative to determine and monitor the positions of the recognised words by determining and monitoring the position of a first letter of each of the recognised words in text of said processing application program means, and said link data comprises the audio identifiers and the determined positions of the first letter of corresponding recognised words.

14. Data processing apparatus as claimed in claim 1 further comprising processing means operative under the control of a computer operating system, wherein said interface application program means comprises an interface application program implemented from within said computer operating system, said processing application program means comprises a processing application program implemented from within said computer operating system, and said interface application program is operative to determine and monitor the positions of the recognised words using operating system functions communicated via the computer operating system.

15. A data processing arrangement comprising:

a data processing apparatus, the data processing apparatus comprising:

input means for receiving recognition data from a speech recognition engine and corresponding audio data, said recognition data including a string of recognised words and audio identifiers identifying audio components corresponding to each recognised word;

interface application program means comprising means for receiving the input recognised words, means for placing the recognised words into positions in text in a processing application program means to allow the processing of the recognised words to change the positions of the recognised words to form a processed word string, means for determining the positions of the recognised words in said processing application program means, means for monitoring changes in the positions of the recognised words, and means for forming link data linking the audio data to the recognised words, said link data comprising the audio identifiers and the determined positions of corresponding recognised words, said interface application program means including means for updating said link data in response to monitored changes in positions of the recognised words;

storage means for storing said recognition data and audio data received from said input means, and for storing said link data;

display means for displaying the recognised words received and processed by said processing application program means;

user operable selection means for selecting at least one word in the displayed words, said interface application program means including means for identifying any audio components, if present, which are linked to the at least one selected word; and audio playback means for playing back any identified audio components in the order of the word positions in the word string or the processed word string; and an editor work station comprising:

data reading means for reading the words, link data, and audio data from said data processing apparatus;

editor processing means for processing the words;

editor link means for linking the audio data to the word positions using the link data;

editor display means for displaying the words being processed;

editor correction means for selecting and correcting any displayed words which have been incorrectly recognised;

editor audio playback means for playing back an audio component corresponding to any selected words to aid correction;

editor speech recognition update means for storing the corrected words and the audio identifier for the audio component corresponding to the corrected word in a word correction file; and data transfer means for transferring the word correction file to said data processing apparatus for later updating of models used by said speech recognition engine;

said data processing apparatus including correction file reading means for reading said word correction file to pass the data contained therein to said speech recognition engine for the updating of the models used by said speech recognition engine.

16. A data processing arrangement as claimed in claim 15 wherein said recognition data includes alternative words, said editor display means including means to display a choice list comprising the alternative words, and said editor correcting means includes means to select one of the alternative words or to enter a new word.

17. A data processing arrangement as claimed in claim 15 including editor contextual update means operable by a user to select recognised words which are to be used to provide contextual correcting parameters to said speech recognition engine of said data processing apparatus, and to store said contextual correcting parameters in a contextual correction file;

said data transfer means being responsive to the contextual correction file to transfer the contextual correction file to said data processing apparatus for later updating of models used by said speech recognition engine;

said correction file reading means of said data processing apparatus being responsive to the contextual correction file to read the contextual correction file to pass the data contained therein to said speech recognition engine.

18. A data processing arrangement as claimed in claim 15 wherein said recognition data includes a likelihood indicator for each word in the word string indicating the likelihood that the word is correct, and said link data includes the likelihood indicators, said editor work station including editor automatic error detection means for detecting possible errors in recognition of words in the recognised words by scanning the likelihood indicators in said recognition data for the words and detecting if the likelihood indicator for a word is below a likelihood threshold, whereby said editor display means highlights words having a likelihood indicator below the likelihood threshold;

editor selection means for selecting a word to replace an incorrectly recognised word highlighted in the text; and second editor correction means for replacing the incorrectly recognised word with the selected word to correct the recognised words.

19. A data processing arrangement as claimed in claim 15 wherein said data processing apparatus includes file storage means for storing the recognised words in a file;

means for selectively disabling one of the receipt of the recognised words by said processing application program means and the recognition of speech by said speech recognition engine for a period of time;

means for storing the audio data during the period of time in said storage means as an audio message associated with the file; and storage reading means for reading said file for input to said processing application program means, and for reading said audio message for playback by said audio playback means;

said editor work station including audio message reading means for reading the audio message associated with words being processed by said editor processing means for playback by said editor audio playback means.

20. A data processing arrangement as claimed in claim 19 wherein said audio message reading means is controllable by a user to read said audio message at any time the associated words are being processed by said editor processing means.

21. An editor work station for use with the data processing arrangement as claimed in claim 15, said editor work station comprising:

data reading means for reading the words, link data, and audio data from said data processing apparatus;

editor processing means for processing words;

editor link means for linking the audio data to the word positions using the link data;

editor display means for displaying the read words;

editor correction means for selecting and correcting any displayed words which have been incorrectly recognised;

editor audio playback means for playing back any audio component corresponding to the selected words to aid correction;

editor speech recognition update means for storing the corrected word and the audio identifier for the audio component corresponding to the corrected word in a character correction file; and data transfer means for transferring the word correction file to said data processing apparatus for later updating of models used by said speech recognition engine.

22. An editor work station as claimed in claim 21 wherein said recognition data includes alternative words, said editor display means including means to display a choice list comprising the alternative words, and said editor correcting means includes means to select one of the alternative words or to enter a new word.

23. An editor work station as claimed in claim 21 including editor contextual update means operable by a user to select recognised words which are to be used to provide contextual correcting parameters to said speech recognition engine of said data processing apparatus, and to store said contextual correcting parameters in a contextual correction file;

said data transfer means being responsive to the contextual correction file to transfer the contextual correction file to said data processing apparatus for later updating of models used by said speech recognition engine;

said correction file reading means of said data processing apparatus being responsive to the contextual correction file to read the contextual correction file to pass the data contained therein to said speech recognition engine.

24. An editor work station as claimed in claim 21 wherein said recognition data includes a likelihood indicator for each word in the word string indicating the likelihood that the word is correct, and said link data includes the likelihood indicators, said editor work station including editor automatic error detection means for detecting possible errors in recognition of words in the recognised words by scanning the likelihood indicators in said recognition data for the words and detecting if the likelihood indicator for a word is below a likelihood threshold, whereby said editor display means highlights characters having a likelihood indicator below the likelihood threshold;

editor selection means for selecting a word to replace an incorrectly recognised word highlighted in the word string; and second editor correction means for replacing the incorrectly recognised word with the selected word to correct the recognised word.

25. A data processing arrangement as claimed in claim 15 comprising a plurality of said data processing apparatus connected to a network, and at least one editor work station, wherein each editor work station can access and edit stored words and audio data on a plurality of said data processing apparatus.

26. A data processing arrangement as claimed in claim 15 wherein said interface application program means is operative to determine and monitor the positions of the recognised words by determining and monitoring the position of a first letter of each of the recognised words in text of said processing application program means, and said link data comprises the audio identifiers and the determined positions of the first letter of corresponding recognised words.

27. Data processing arrangement as claimed in claim 15 further comprising processing means operative under the control of a computer operating system, wherein said interface application program means comprises an interface application program implemented from within said computer operating system, said processing application program means comprises a processing application program implemented from within said computer operating system, and said interface application program is operative to determine and monitor the positions of the recognised words using operating system functions communicated via the computer operating system.

28. A data processing method comprising:

receiving recognition data from a speech recognition engine and corresponding audio data in an interface application program, said recognition data including a string of recognised words and audio identifiers identifying audio components corresponding to each recognised word;

storing the audio data;

inputting the recognised words into a processing application program which places the words in positions in the application, and which processes the recognised words such that positions of the recognised words are changed to form a processed word string;

using the interface application program to determine the positions of the recognised words in the processing application program, monitor changes in the positions of the recognised words, and to form link data linking the audio data to the recognised words, said link data comprising the audio identifiers and the determined positions of corresponding recognised words, said link data being updated in response to monitored changes in positions of the recognised words;

displaying the recognised words input to and processed by the processor application;

selecting at least one displayed word, whereby said link data identifies any audio components, if present, which are linked to the at least one selected word; and playing back any selected audio components in the order of the word positions in the word string.

29. A method as claimed in claim 28 wherein the words and the link data are also stored, the method including: reading the stored words into the processor application program and reading the stored link data.

30. A method as claimed in claim 28 including: selecting any displayed words which have been incorrectly recognised, playing back an audio component corresponding to any selected words to aid correction, correcting the incorrectly recognised words, and sending the corrected word and audio identifier for the audio component corresponding to the corrected word to the speech recognition engine.

31. A method as claimed in claim 30 wherein said recognition data includes alternative words, the method includes displaying a choice list when any displayed words have been selected for correction, said choice list comprising said alternative words; and said correction of the incorrectly recognised words comprises selecting one of the alternative words or inputting a new word.

32. A method as claimed in claim 30 including: selecting recognised words which are to be used to provide contextual correcting parameters to said speech recognition engine, and sending the contextual correcting parameters to said speech recognition engine.

33. A method as claimed in claim 28 wherein said audio identifiers comprise a list of positions of the corresponding audio components in the audio data.

34. A method as claimed in claim 33 wherein said word string is formed of a plurality of separately dictated passages of words, the method including: storing said audio data for each dictated passage of words in separate files, said link data including a list identifying the files and positions in the files of the audio components in said audio data corresponding to the word locations in the word string.

35. A method as claimed in claim 28 wherein said recognition data includes recognition status indicators to indicate whether each recognised word is a word finally selected as recognised by said speech recognition engine or a word which is the most likely at that time but which is still being recognised by said speech recognition engine, the method including: detecting said recognition status indicators, displaying words which are still being recognised differently to the words which have been recognised, and forming said link data by linking the positions of the recognised words in the word string to the positions of the corresponding audio components in the audio data.

36. A method as claimed in claim 28 wherein said recognition data includes a likelihood indicator for each word in the word string indicating the likelihood that the word is correct, the method including:

detecting possible errors in recognition of words in the word string by scanning the likelihood indicators for the recognised words, and detecting if the liklihood indicator for a word having a likelihood threshold;

highlighting the word having a likelihood indicator below the likelihood threshold;

if the highlighted word is an incorrectly recognised word, selecting a word to replace an incorrectly recognised word highlighted in the recognised words; and replacing the incorrectly recognised word with the selected word to correct the recognised words.

37. A method as claimed in claim 28 including:

storing the recognised words as a file;

selectively disabling one of the importation of recognised words into the processor application program and the recognition of speech by said speech recognition engine for a period of time;

storing the audio data during the period of time as an audio message associated with the file;

at a later time, reading said file for input to the processor application program; and allowing a user to select whether to read and playback said audio message associated with said file.

38. A method as claimed in claim 37 wherein said audio message can be read and played back at any time said file is open in the processor.

39. A method as claimed in claim 28 including allowing a user to select to playback the audio data for the most recent passage of dictated words.

40. A method of processing data comprising:

at an author work station, carrying out the method as claimed in claim 28 wherein the recognised words, the link data and the audio data are stored; and at an editor work station, obtaining the stored recognised words, link data and audio data from the author work station;

inputting the recognised words into a processor application program;

linking the audio data to the word positions using the link data;

displaying the words being processed;

selecting any displayed words which have been incorrectly recognised;

playing back any audio component corresponding to the selected words to aid correction;

correcting the incorrectly recognised words;

storing the corrected word and the audio identifier for the audio component corresponding to the corrected word in a word correction file; and transferring the word correction file to the author work station for later updating of models used by said speech recognition engine;

wherein, at a later time, said word correction file is read at said author work station to pass the data contained therein to said speech recognition engine for updating of said models.

41. A method as claimed in claim 40 wherein said recognition data includes alternative words, and the correction of the incorrectly recognised words at said editor work station, comprises: displaying a choice list comprising the alternative words, and selecting one of the alternative words or entering a new word.

42. A method as claimed in claim 40 including at said editor work station: selecting recognised words which are to be used to provide contextual correcting parameters to said speech recognition engine at said author work station;

storing said contextual correcting parameters in a contextual correction file; and transferring said contextual correction file to said author work station for later updating of models used by said speech recognition engine; and at said author work station, at a later time, reading the transferred contextual correction file and passing the data contained therein to said speech recognition engine.

43. A method as claimed in claim 40 wherein said recognition data includes a likelihood indicator for each word in the word string indicating the likelihood that the word is correct, the method including at said editor work station:

automatically detecting possible errors in recognition of words by scanning the likelihood indicators for the words;

detecting if the likelihood indicator for a word is below a likelihood threshold, whereby words having a likelihood indicator below the likelihood threshold are displayed highlighted;

selecting a word to replace an incorrectly recognised word highlighted in the word string; and replacing the incorrectly recognised word with the selected word to correct the recognised words.

44. A method as claimed in claim 40 wherein the method includes:

at said author work station, storing the words as a file;

selectively disabling one of the importation of recognised words into the processor application program and the recognition of speech by said speech recognition engine for a period of time;

storing the audio data for the period of time as an audio message associated with the file;

at a later time, reading said file for input to the processor application program; and, at said editor work station, reading the audio message associated with the file being processed by the processor application program, and playing back the read audio message.

45. A method as claimed in claim 44 wherein the audio message can be read and played back at any time said file is open in the processor application program.

46. A method as claimed in claim 40 including allowing a user of the editor work station to playback the audio data for the most recent passage of dictated words.

47. A method as claimed in claim 40 wherein the positions of the recognised words are determined and monitored by determining and monitoring the position of a first letter of each of the recognised words in text of the processing application program, and said link data comprises the audio identifiers and the determined positions of the first letter of corresponding recognised words.

48. A method as claimed in claim 40 wherein the interface application program and the processing application program are both implemented from within a computer operating system, and the positions of the recognised words in said processing application program are determined and monitored using operating system functions communicated via the computer operating system.

49. A data processing method as claimed in claim 28 wherein the positions of the recognised words are determined and monitored by determining and monitoring the position of a first letter of each of the recognised words in text of the processing application program, and said link data comprises the audio identifiers and the determined positions of the first letter of corresponding recognised words.

50. A method as claimed in claim 28 wherein the interface application program and the processing application program are both implemented from within a computer operating system, and the positions of the recognised words in said processing application program are determined and monitored using operating system functions communicated via the computer operating system.

51. A computer usable medium having computer readable instructions stored therein for causing a processor in a data processing apparatus to process recognition signals defining a string of recognised words and corresponding audio data signals to display the words and selectively play the audio data, the instructions comprising instructions for:

a) causing the processor to receive the recognition signals from a speech recognition engine and the audio data signals, the recognition signals including a string of recognised words and audio identifiers identifying audio components corresponding to each recognised word;

b) causing the processor to store the audio data;

c) causing the processor to implement an interface application program which receives the recognised words and places the words in positions in a processing application program which can process the recognised words such that the positions of the recognised words are changed to form a processed word string;

d) causing the processor to implement the interface application program to determine the positions of the recognised words in the processing application program and to monitor changes in the positions of the recognised words;

e) causing the processor to implement the interface application program to form link data linking the audio data to the recognized words, wherein said link data comprises the audio identifiers and the determined positions of corresponding recognised words, and to update said link data in response to monitored changes in positions of the recognised words;

f) causing the processor to generate an image of the recognised words on a display;

g) causing the processor to receive a selection signal generated by a user for selecting at least one word and to identify audio components corresponding to the at least one selected word; and h) causing the processor to send the identified audio components in the order of the word positions in the word string to an audio play back device.

52. Data processing apparatus comprising:

input means for receiving recognition data and corresponding audio data from a speech recognition engine, said recognition data including a string of recognised characters and audio identifiers identifying audio components corresponding to a character component of the recognised characters;

storage means for storing said audio data received from said input means;

processing means for receiving and processing the input recognised characters to at least one of replace, insert move and position the recognised characters to form a processed character string;

link means for forming link data linking the audio identifiers to the character component positions in the character string and for updating said link data after processing to maintain the link between the audio identifiers and the character component positions in the processed character string;

display means for displaying the characters received by said processing means;

user operable selection means for selecting characters in the displayed characters for audio playback, where said link data identifies any selected audio components, if present, which are linked to the selected characters;

audio playback means for playing back the selected audio components in the order of the character component positions in the character string or the processed character string;

file storage means for storing the recognised characters in a file;

means for selectively disabling one of the receipt of the recognised characters by said processing means and the recognition of speech by said speech recognition engine for a period of time, means for storing the audio data for the period of time in said storage means as an audio message associated with the file; and storage reading means for reading said file for input to said processing means, and for reading said audio message for playback by said audio playback means.

53. Data processing apparatus as claimed in claim 52 wherein said storage reading means is controllable by a user to read said audio message at any time after said file has been input to said processing means until said processing means is no longer processing said file.

54. A data processing arrangement comprising:

a data processing apparatus, the data processing apparatus comprising:

input means for receiving recognition data and corresponding audio data from a speech recognition engine, said recognition data including a string of recognised characters and audio identifiers identifying audio components corresponding to a character component of the recognised characters;

processing means for receiving and processing the input recognised characters to at least one of replace, insert move and position the recognised characters to form a processed character string;

link means for forming link data linking the audio identifiers to the character component positions in the character string and for updating said link data after processing to maintain the link between the audio identifiers and the character component positions in the processed character string;

storage means for storing said recognition data and audio data received from said input means, and for storing said link data;

display means for displaying the characters received by said processing means;

user operable selection means for selecting characters in the displayed characters for audio playback, where said link data identifies any selected audio components, if present, which are linked to the selected characters; and audio playback means for playing back the selected audio components in the order of the character component positions in the character string or the processed character string;

file storage means for storing the recognised characters in a file;

means for selectively disabling one of the receipt of the recognised characters by said processing means and the recognition of speech by said speech recognition engine for a period of time with means for storing the audio data for the period of time in said storage means as an audio message associated with the document;

storage reading means for reading said document for input to said processing means, and for reading said audio message for playback by said audio playback means; and an editor work station comprising:

data reading means for reading the characters, link data, and audio data from said data processing apparatus;

editor processing means for processing the characters;

editor link means for linking the audio data to the character component position using the link data;

editor display means for displaying the characters being processed;

editor correction means for selecting and correcting any displayed characters which have been incorrectly recognised;

editor audio playback means for playing back any audio component corresponding to the selected characters to aid correction;

editor speech recognition update means for storing the corrected characters and the audio identifier for the audio component corresponding to the corrected character in a character correction file;

data transfer means for transferring the character correction file to said data processing apparatus for later updating of models used by said speech recognition engine; and audio message reading means for reading the audio message associated with characters being processed by said editor processing means for playback by said editor audio playback means;

said data processing apparatus including correction file reading means for reading said character correction file to pass the data contained therein to said speech recognition engine for the updating of the models used by said speech recognition engine.

55. A data processing arrangement as claimed in claim 54 wherein said audio message reading means is controllable by a user to read said audio message at any time the associated characters are being processed by said editor processing means.

56. A data processing method comprising:

receiving recognition data and corresponding audio data from a speech recognition engine, said recognition data including recognised characters and audio identifiers identifying audio components corresponding to text components in the recognised text;

storing the audio data;

inputting the recognised characters to a processor for the processing of the characters to at least one of replace, insert move and position the characters to form a processed character string;

forming link data linking the audio identifiers to the character component positions in the characters and updating said link data after processing to maintain the link between the audio identifiers and the character component positions in the processed character string;

displaying the characters input to the processor;

selecting displayed characters for audio playback, whereby said link data identifies any selected audio components, if present, which are linked to the selected characters;

playing back the selected audio components in the order of the character component positions in the character string;

storing the characters as a file;

selectively disabling one of the importation of recognised characters into the processor and the recognition of speech by said speech recognition engine for a period of time;

storing the audio data for the period of time as an audio message associated with the file;

at a later time, reading said file for input to the processor; and allowing a user to select whether to read and playback said audio message associated with said file.

57. A method as claimed in claim 56 wherein said audio message can be read and played back at any time said file is open in the processor.

58. A method of processing data comprising:

at an author work station:

receiving recognition data and corresponding audio data from a speech recognition engine, said recognition data including recognised characters and audio identifiers identifying audio components corresponding to text components in the recognised text;

storing the audio data;

inputting the recognised characters to a processor for the processing of the characters to at least one of replace, insert move and position the characters to form a processed character string;

forming link data linking the audio identifiers to the character component positions in the characters and updating said link data after processing to maintain the link between the audio identifiers and the character component positions in the processed character string;

displaying the characters input to the processor;

selecting displayed characters for audio playback, whereby said link data identifies any selected audio components, if present, which are linked to the selected characters; and playing back the selected audio components in the order of the character component positions in the character string; wherein the characters, the link data, and the audio data are stored; and at an editor work station:

obtaining the stored characters, link data and audio data from the author work station;

inputting the characters into a processor;

linking the audio data to the character component positions using the link data;

displaying the characters being processed;

selecting any displayed characters which have been incorrectly recognised;

playing back any audio component corresponding to the selected characters to aid correction;

correcting the incorrectly recognised characters;

storing the corrected characters and the audio identifier for the audio component corresponding to the corrected character in a character correction file; and transferring the character correction file to the author work station for later updating of models used by said speech recognition engine;

wherein, at a later time, said character correction file is read at said author work station to pass the data contained therein to said speech recognition engine for updating of said models;

wherein, at said author work station, storing the characters as a file;

selectively disabling one of the importation of recognised characters into the processor and the recognition of speech by said speech recognition engine for a period of time;

storing the audio data for the period of time as an audio message associated with the file; and at a later time, reading said file for input to the processor; and at said editor work station, reading the audio message associated with the file being processed by the processor, and playing back the read audio message.

59. A method as claimed in claim 58 wherein the audio message can be read and played back at any time said file is open in the processor.

60. A universal speech-recognition interface that enables operative coupling of a speech-recognition engine to at least any one of a plurality of different computer-related applications, the universal speech-recognition interface comprising:

input means for receiving speech-recognition data including recognised words;

output means for outputting the recognised words into at least any one of the plurality of different computer-related applications to allow processing of the recognised words as input text; and audio playback means for playing audio data associated with the recognised words.

61. The universal speech-recognition interface of claim 60, further comprising:

means, independent of the one computer-related application, for forming link data linking a portion of the audio data to at least one the recognised words independently of the one computer-related application, the link data comprising:

one or more audio identifiers which link a portion of the audio data to one or more recognised words; and one or more position identifiers which link the recognised words to corresponding positions within the one computer-related application; and means, independent of the one computer-related application, for updating the position identifiers in response to changes in positions of the recognised words within the one computer-related application.

62. The universal speech-recognition interface of claim 60 further comprising:

user operable selection means for selecting one or more of the recognised words in the one computer-related application, wherein the audio playback means is responsive to the selection means to playback audio data associated with the one or more recognised words.

63. The universal speech-recognition interface of claim 60 wherein the plurality of different computer-related applications includes a wordprocessing application and at least one of a spreadsheet processing application, an electronic-mail application, a presentation application, and a computer-aided-design application.

64. A speech-recognition interface that enables operative coupling of a speech-recognition engine to a computer-related application, the interface comprising:

input means for receiving speech-recognition data including recognised words;

output means for outputting the recognised words into a computer-related application to allow processing of the recognised words as input text, including changing positions of the recognised words; and means, independent of the computer-related application, for determining positions of the recognised words in the computer-related application.

65. The speech-recognition interface of claim 64, further comprising:

means, independent of the computer-related application, for monitoring changes in positions of the recognised words in the computer-related application.

66. The speech-recognition interface of claim 64, further comprising:

means, independent of the computer-related application, for forming link data linking a portion of the audio data to at least one of the recognised words independently of the computer-related application, the link data comprising:

one or more audio identifiers which link a portion of the audio data to one or more recognised words; and one or more position identifiers which link the recognised words to corresponding positions within the computer-related application; and means, independent of the computer-related application, for updating the position identifiers in response to changes in positions of the recognised words within the computer-related application.

67. The speech-recognition interface of claim 64, further comprising:

audio playback means for playing audio data associated with the recognised words.

68. The universal speech-recognition interface of claim 67, further comprising:

user operable selection means for selecting one or more of the recognised words in the computer-related application, wherein the audio playback means is responsive to the selection means to playback audio data associated with the one or more recognised words.

69. Data processing apparatus comprising input means for receiving recognition data from a speech recognition engine and corresponding audio data, said recognition data including a string of recognised words and audio identifiers identifying audio components corresponding to each of the recognised words;

processing means for implementing an interface application program which receives the input recognised words, inputs the recognised words into a processing application program to process the input recognised words to cause the recognised words to be moved, and forms link data linking the audio data to the recognised words, said link data comprising the audio identifiers and information identifying the corresponding recognised words;

display means for displaying the words received and processed by said processing application program;

user operable selection means for selectively identifying a word in the displayed words, wherein said interface application program is operative to compare the identity of the selected word with said link data to identify any corresponding audio component; and audio playback means for playing back any identified corresponding audio component.

70. Data processing apparatus as claimed in claim 69 including storage means for storing said link data, and said audio data.

71. A data processing method comprising:

inputting recognition data from a speech recognition engine and corresponding audio data, said recognition data including a string of recognised words and audio identifiers identifying audio components corresponding to each of the recognised words;

inputting the recognised words to a processor implementing an interface application program to receive the input recognised words, to pass the recognised words to a processing application program for processing the recognised words to cause the recognised words to be moved, and to form link data linking the audio data to the recognised words, said link data comprising the audio identifiers and information identifying the corresponding recognised words;

displaying the recognised words input to and processed by the processor application program;

selectively identifying a word in the displayed words;

using the interface application program to compare the identity of the selected word with said link data to identify any corresponding audio component; and playing back any identified corresponding audio component.

72. A method as claimed in claim 71 including storing the audio data and the link data.

73. A computer usable medium having computer readable instructions stored therein for causing a processor in a data processing apparatus to process recognition signals defining a string of recognised words and corresponding audio data to display the words and selectively play the audio data, the instructions comprising instructions for:

a) causing the processor to input the recognition signals from a speech recognition engine and the audio data, the recognition signals including a string of recognised words and audio identifiers identifying audio components corresponding to each recognised word;

b) causing the processor to implement an interface application program to receive the input recognised words and to input the recognised words into a processing application program to process the recognised words to cause the recognised words to be relatively moved;

c) causing the processor to implement the interface application program to form link data linking the audio data to the recognised words, said link data comprising the audio identifiers and information identifying the corresponding recognised words;

d) causing the processor to generate an image of the recognised words on a display;

e) causing the processor to receive a selection signal generated by a user for selectively identifying a word in the displayed words;

f) causing the processor to implement the interface application program to compare the identity of the selected word with said link data to identify any corresponding audio component; and g) causing the processor to send the identified corresponding audio component to an audio playback device.

74. A computer usable medium as claimed in claim 73 wherein the instructions include instructions for causing the processor to store said link data and said audio data.

75. Data processing apparatus comprising:

input means for receiving recognition data from a speech recognition engine and corresponding audio data, said recognition data including a string of recognised words and audio identifiers including audio components corresponding to each recognised word;

storage means for storing the audio data received from said input means;

processing means operative under the control of an operating system to implement a first application program which receives the input recognised words in text positions, and which processes the recognised words such that the positions of the recognised words are changed to form a processed word string, and a second application program which determines the positions of and monitors changes in the positions of the recognised words in said first application program using operating system functions communicated via the computer operating system, and which forms link data linking the audio data to the recognised words and updates said link data in response to monitored changes in the positions of the recognised words, said link data comprising the audio identifiers and the determined positions of corresponding recognised words;

display means for displaying the recognised words;

user operable selection means for selecting at least one word in the displayed words, wherein said second application program is operative to identify any selected audio components, if present, which are linked to the at least one selected word; and audio playback means for playing back any selected audio component.

76. Data processing apparatus as claimed in claim 75 including means operable by a user to allow the selection of said second application program from amongst a plurality of application programs implementable within the computer operating system.

77. A data processing method comprising:

inputting recognition data from a speech recognition engine and corresponding audio data, said recognition data including a string of recognised words and audio identifiers identifying audio components corresponding to each of the recognised words;

storing the audio;

implementing a first application program within a computer operating system to receive the input recognised words in text positions, and to process the recognised words such that the positions of the recognised words are changed to form a processed word string;

implementing a second application program from within the computer operating system to determine the positions of the recognised words and monitor changes in the positions of the recognised words in the first application program using operating system functions communicated via the computer operating system, to form link data linking the audio data to the recognised words, and to update the link data in response to monitored changes in the positions of the recognised words, wherein said link data comprises the audio identifiers and the determined positions of corresponding recognised words;

displaying the recognised words;

selecting at least one word in the displayed words, wherein the second application program identifies any selected audio components, if present, which are linked to the at least one selected word; and playing back any selected audio component.

78. A method as claimed in claim 77 including selecting the second application program from amongst a plurality of possible application programs implementable within the computer operating system.

* * * * *

UNITED STATES PATENT AND TRADEMARK OFFICE
CERTIFICATE OF CORRECTION

PATENT NO. : 5,799,273
DATED : August 25, 1998
INVENTOR(S) : John C. Mitchell et al.

It is certified that error appears in the above-identified patent and that said Letters Patent is hereby corrected as shown below:

At Col. 11, line 66, please delete "to FIG. 9, when" and insert --to FIGS. 9A and 9B, when At Col. 23, line 6, claim 36, please delete "having" and insert --is below--.

At Col. 29, line 40, claim 61, please delete "one the" and insert --one of the--.

At Col. 30, line 36, claim 68, please delete "universal" after "The".

Signed and Sealed this

Thirtieth Day of March, 1999

Attest:

Q. TODD DICKINSON

Attesting Officer

Acting Commissioner of Patents and Trademarks